(12) United States Patent
Choi et al.

(10) Patent No.: US 11,227,278 B2
(45) Date of Patent: Jan. 18, 2022

(54) METHOD FOR PROVIDING PAYMENT SERVICE HAVING PLUG-IN SERVICE, AND ELECTRONIC DEVICE THEREFOR

(71) Applicant: Samsung Electronics Co., Ltd., Gyeonggi-do (KR)

(72) Inventors: Hoon Choi, Gyeonggi-do (KR); Je-Min Lee, Gyeonggi-do (KR); Yongseok Park, Gyeonggi-do (KR); Dong-Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 15/939,463

(22) Filed: Mar. 29, 2018

(65) Prior Publication Data

US 2018/0285856 A1 Oct. 4, 2018

(30) Foreign Application Priority Data

Mar. 29, 2017 (KR) .......................... 10-2017-0039869

(51) Int. Cl.
*G06Q 20/32* (2012.01)
*G06Q 20/40* (2012.01)
(Continued)

(52) U.S. Cl.
CPC ........... *G06Q 20/3227* (2013.01); *G06F 8/61* (2013.01); *G06F 9/44526* (2013.01);
(Continued)

(58) Field of Classification Search
None
See application file for complete search history.

(56) References Cited

U.S. PATENT DOCUMENTS 6,286,041 B1 * 9/2001 Collins, III ............... G06F 8/61
709/201
2008/0064383 A1 3/2008 Nath et al.
(Continued)

FOREIGN PATENT DOCUMENTS

CN 103530554 A 1/2014
KR 10-2011-0127864 A 11/2011
(Continued)

OTHER PUBLICATIONS

European Search Report dated Dec. 6, 2019.
(Continued)

*Primary Examiner* — Bennett M Sigmond
*Assistant Examiner* — Marla Hudson
(74) *Attorney, Agent, or Firm* — Cha & Reiter, LLC

(57) ABSTRACT

An electronic device and method are disclosed herein. The electronic device includes a touch screen display, a wireless communication circuit, a processor and a memory. The processor implements the method, including receiving a first user input indicating a transaction card associated with an issuer identification, storing information for the transaction card, transmitting to a request to initiate a search for a plug-in software program associated with the issuer identification, receiving a response identifying at least one searched plug-in software program, receiving a second user input requesting installation of the at least one plug-in software program, transmitting an access request requesting download of the at least one plug-in software program, downloading and installing the at least one plug-in software program, transmitting a request for authentication of the installed at least one plug-in software program, and based on a result of the authentication completing the installation.

20 Claims, 21 Drawing Sheets

(51) Int. Cl.
  *G06F 9/445* (2018.01)
  *G06F 8/61* (2018.01)
  *G06Q 30/02* (2012.01)
(52) U.S. Cl.
  CPC ......... *G06Q 20/3278* (2013.01); *G06Q 20/40* (2013.01); *G06Q 30/0236* (2013.01)

(56) References Cited

U.S. PATENT DOCUMENTS

| | | |
|---|---|---|
| 2009/0028079 A1 | 1/2009 | Song et al. |
| 2009/0288079 A1 | 11/2009 | Zuber et al. |
| 2013/0151414 A1* | 6/2013 | Zhu .................... G06Q 20/4014 |
| | | 705/44 |
| 2014/0066015 A1 | 3/2014 | Aissi |
| 2015/0012924 A1 | 1/2015 | Liu et al. |
| 2015/0121083 A1 | 4/2015 | Zhang |
| 2015/0347200 A1* | 12/2015 | Fadel ........................ G06F 9/54 |
| | | 719/319 |
| 2016/0048382 A1* | 2/2016 | Xi ............................ G06F 8/65 |
| | | 717/168 |
| 2017/0109752 A1* | 4/2017 | Hubbard ................ G06Q 20/34 |

FOREIGN PATENT DOCUMENTS

| | | |
|---|---|---|
| KR | 10-2016-0029583 A | 3/2016 |
| KR | 10-1634902 B1 | 6/2016 |

OTHER PUBLICATIONS

International Search Report dated Jun. 27, 2018.
European Search Report dated May 28, 2021.
Korean Search Report dated Feb. 4, 2021.

* cited by examiner

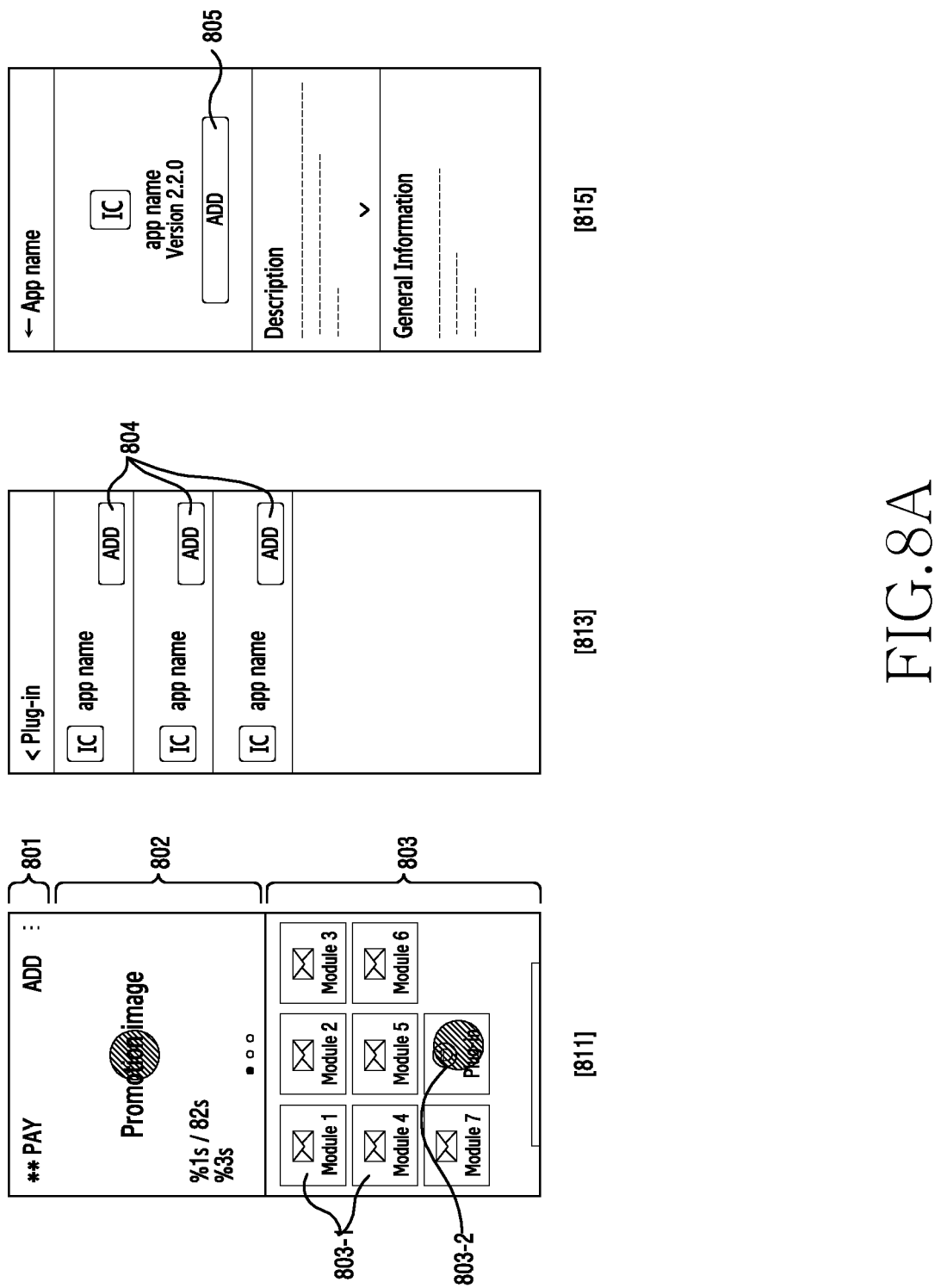

METHOD FOR PROVIDING PAYMENT SERVICE HAVING PLUG-IN SERVICE, AND ELECTRONIC DEVICE THEREFOR

CROSS-REFERENCE TO RELATED APPLICATION(S)

This application is based on and claims priority under 35 U.S.C. § 119 to Korean Patent Application No. 10-2017-0039869, filed on Mar. 29, 2017, in the Korean Intellectual Property Office, the disclosure of which is incorporated by reference herein in its entirety.

BACKGROUND

Field

The present disclosure relates to a method for installing and authenticating plug-in applications, and an electronic device therefor.

Description of Related Art

Electronic devices (for example, mobile terminals, smart phones, wearable devices, or the like) may provide various functions. For example, smart phones may provide a short range wireless communication function (Bluetooth, WiFi, near field communication (NFC), etc.) a mobile communication function ($3^{rd}$ generation (3G), 4G, 5G, or the like), a music or video replay function, a capturing function, a navigation function, or the like.

The electronic device may include a plurality of applications (hereinafter, referred to as app). For example, the electronic device may include a mobile payment app to provide secure data processes for executing data transactions, such as those involving mobile payment services. It is common that the mobile payment app includes various secured information such as an associated payment card or a bank account, etc.

The above information is presented as background information only to assist with an understanding of the present disclosure. No determination has been made, and no assertion is made, as to whether any of the above might be applicable as prior art with regard to the present disclosure.

SUMMARY

Suppliers of the payment means (for example, a card company, a bank, etc.) may provide various services (hereinafter, referred to as third party services). The third party services may be periodically or frequently generated, updated, or ended.

To use various third party services, a user of the electronic device should install a separate third party app that is distinguished from the mobile payment app. In addition, the user of the electronic device may have inconvenience of having to individually use various apps to use various third party services.

To solve the above-mentioned problems, various embodiments of the present disclosure provide a method for providing a payment service having a plug-in service, and an electronic device therefor.

Various embodiments of the present disclosure provide a method for providing a payment service having a plug-in service, which can enhance security by performing authentication when installing a plug-in app which is installed as a portion of a payment app, and an electronic device therefor.

In accordance with an aspect of the present disclosure, an electronic device is disclosed, including a housing, a touch screen display exposed through a portion of the housing, a wireless communication circuit disposed at least partially within the housing, a processor disposed inside the housing and operatively connected with the display and the communication circuit; and a memory disposed inside the housing and operatively connected with the processor, wherein the memory stores instructions executable to cause the processor to: receive a first user input indicating information for a transaction card associated with an issuer identification, store the indicated information for the transaction card in association with an application program for executing a payment through the electronic device, transmit, to a first external server through the communication circuit, a request to initiate a search for a plug-in software program associated with the issuer identification, receive, from the first external server through the communication circuit, a response identifying at least one plug-in software program identified by the search, display a user interface for installing the at least one plug-in software program on the display, receive a second user input to the user interface requesting installation of the at least one plug-in software program, transmit an access request requesting download of the at least one plug-in software program to a second external server through the communication circuit, download the at least one plug-in software program from the second external server through the communication circuit, install the at least one plug-in software program, transmit a request for authentication of the installed at least one plug-in software program, and based at least in part on a result of the authentication, complete the installation of the at least one plug-in software program.

In accordance with an aspect of the present disclosure, method in an electronic device is disclosed. The method includes: receiving a first user input indicating a transaction card associated with an issuer identification, storing information for the transaction card in association with an application program for executing a payment through the electronic device, transmitting, to a first external server, a request to initiate a search for a plug-in software program associated with the issuer identification, receiving, from the first external server, a response at least one searched plug-in software program identified by the search, display a user interface for installing the at least one plug-in software program on a display, receiving a second user input to the user interface requesting installation of the at least one plug-in software program, transmitting an access request requesting download of the at least one plug-in software program to a second external server through a communication circuit, downloading the at least one plug-in software program from the second external server through the communication circuit, installing the at least one plug-in software program, transmitting a request for authentication of the installed at least one plug-in software program, and based at least in part on a result of the authentication, completing the installation of the at least one plug-in software program.

BRIEF DESCRIPTION OF THE DRAWINGS

The above and other aspects and features of certain embodiments of the present disclosure will be more apparent from the following description taken in conjunction with the accompanying drawings, in which:

FIG. 8A, FIG. 8B, FIG. 8C and FIG. 8D are views showing an example of a screen to explain a method for installing a plug-in app by using a payment app according to an embodiment of the present disclosure;

DETAILED DESCRIPTION

Figure 1:
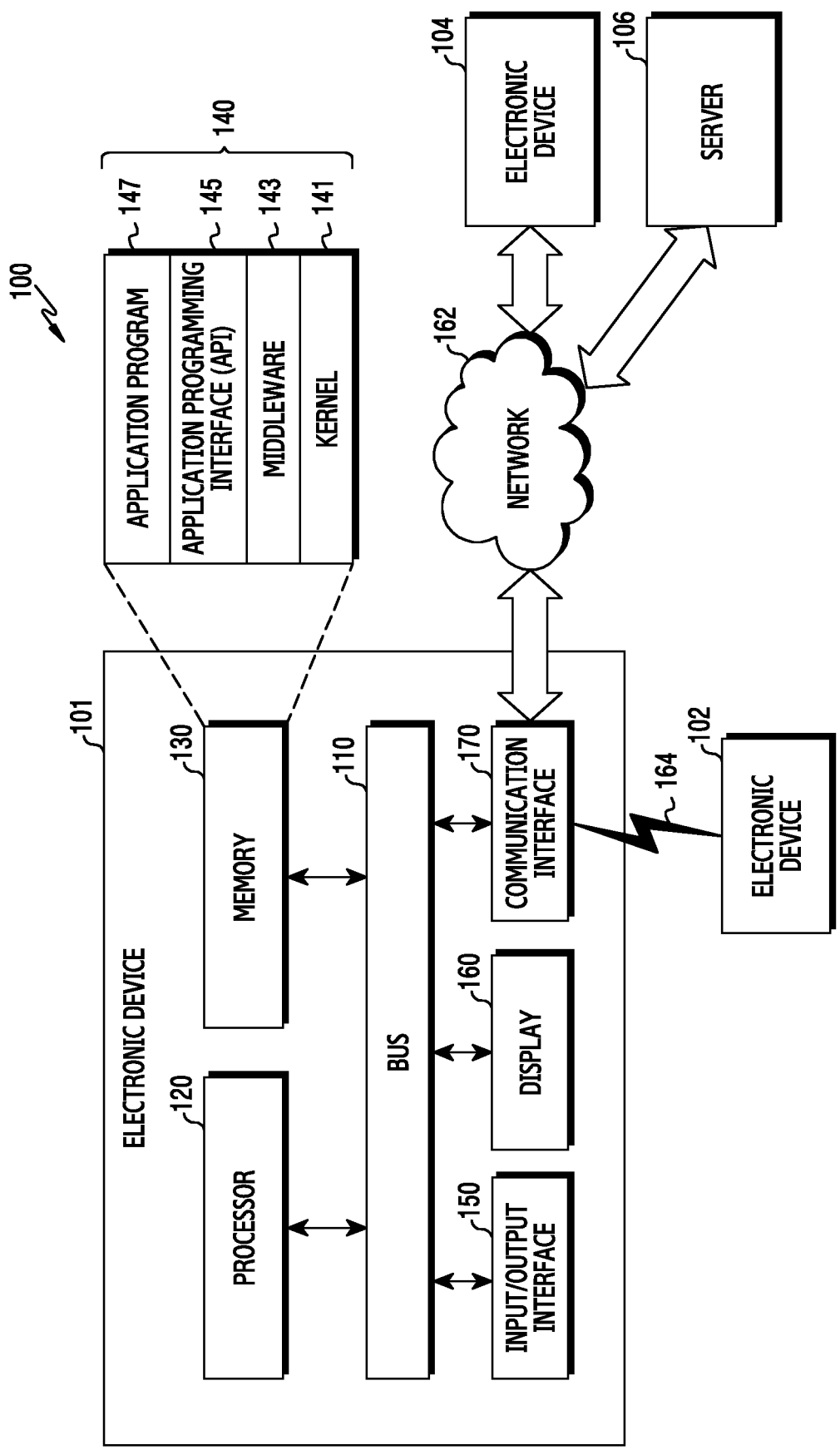
FIG. 1 is a view showing a network environment including an electronic device according to various embodiments of the present disclosure.

Various embodiments of the present disclosure are described in greater detail with reference to the accompanying drawings. The same or similar components may be designated by the same or similar reference numerals although they are illustrated in different drawings. Detailed descriptions of implementations or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto.

According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 is a block diagram of an electronic device in a system (100), according to an embodiment of the present disclosure.

Referring initially to FIG. 1, electronic devices 101, 102, 104 and/or a server 106 may be connected to each other via a network 162 and/or a wireless (e.g., short-range) communication 164. The electronic device 101 includes a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may be provided without at least one of the components, or may include at least one additional component.

The bus 110 may include a circuit for connecting the components 120 through 170 and delivering communication signals (e.g., control messages or data) therebetween.

The processor 120 may include various processing circuitry, such as, for example, and without limitation one or more of a dedicated processor, a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store one or more instructions or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver one or more instructions or data input from a user or another external device to other component(s) of the electronic device 101, or output one or more instructions or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part.

The communication interface 170 may include various communication circuitry and, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication. The communication interface 170 may additionally communicate with the first external electronic device 102 using a short-range wireless communication connection 164.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2:
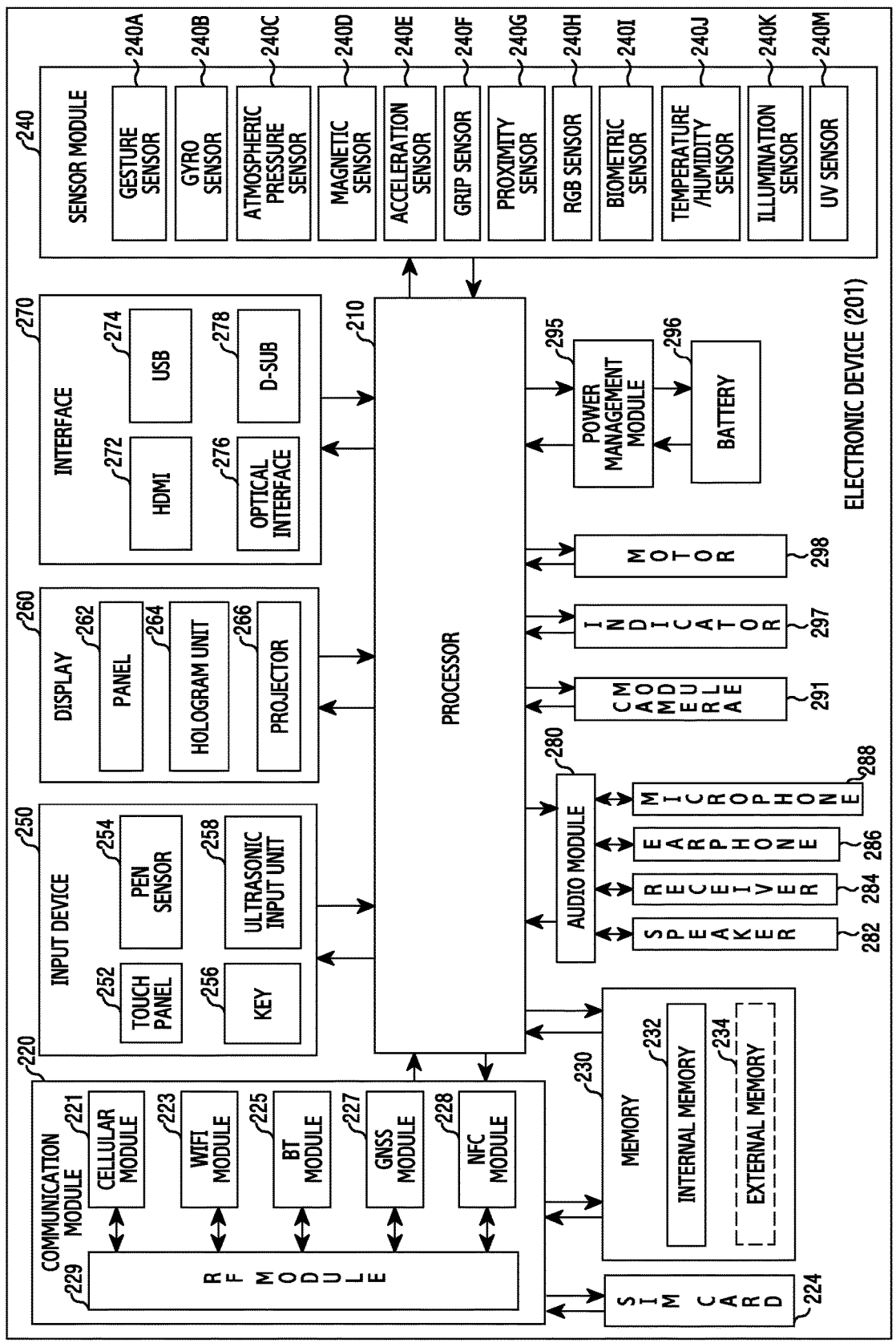
FIG. 2 is a block diagram of an electronic device according to various embodiments.

FIG. 2 is a block diagram of an electronic device, according to an embodiment of the present disclosure.

The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210, for example, may include various processing circuitry and may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load one or more instructions or data received from at least one other component (e.g., a nonvolatile memory) into a volatile memory, process the one or more instructions, and store various data in the nonvolatile memory.

The communication module 220 may have the same or similar configuration as the communication interface 170 of FIG. 1. The communication module 220 may include various communication circuitry, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module.

The SIM 224, for example, may include a card or an embedded SIM, and also may contain unique identification information (e.g., an integrated circuit card identifier (IC-CID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The input device 250 may include various input circuitry including at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201.

The interface 270 includes various interface circuitry, such as an HDMI 272, a USB 274, an optical interface 276, or a D-subminiature (D-sub) 278. The interface 270 may be included in, for example, the communication interface 170 of FIG. 1. Additionally or alternately, the interface 270 may include a mobile high-definition link (MHL) interface, a SD card/MMC interface, or an infrared data association (IrDA) standard interface.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288. The camera module 291, as a device for capturing still images and videos, may include one or more image sensors (e.g., a front sensor or a rear sensor), a lens, an image signal processor (ISP), or a flash (e.g., an LED or a xenon lamp). The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
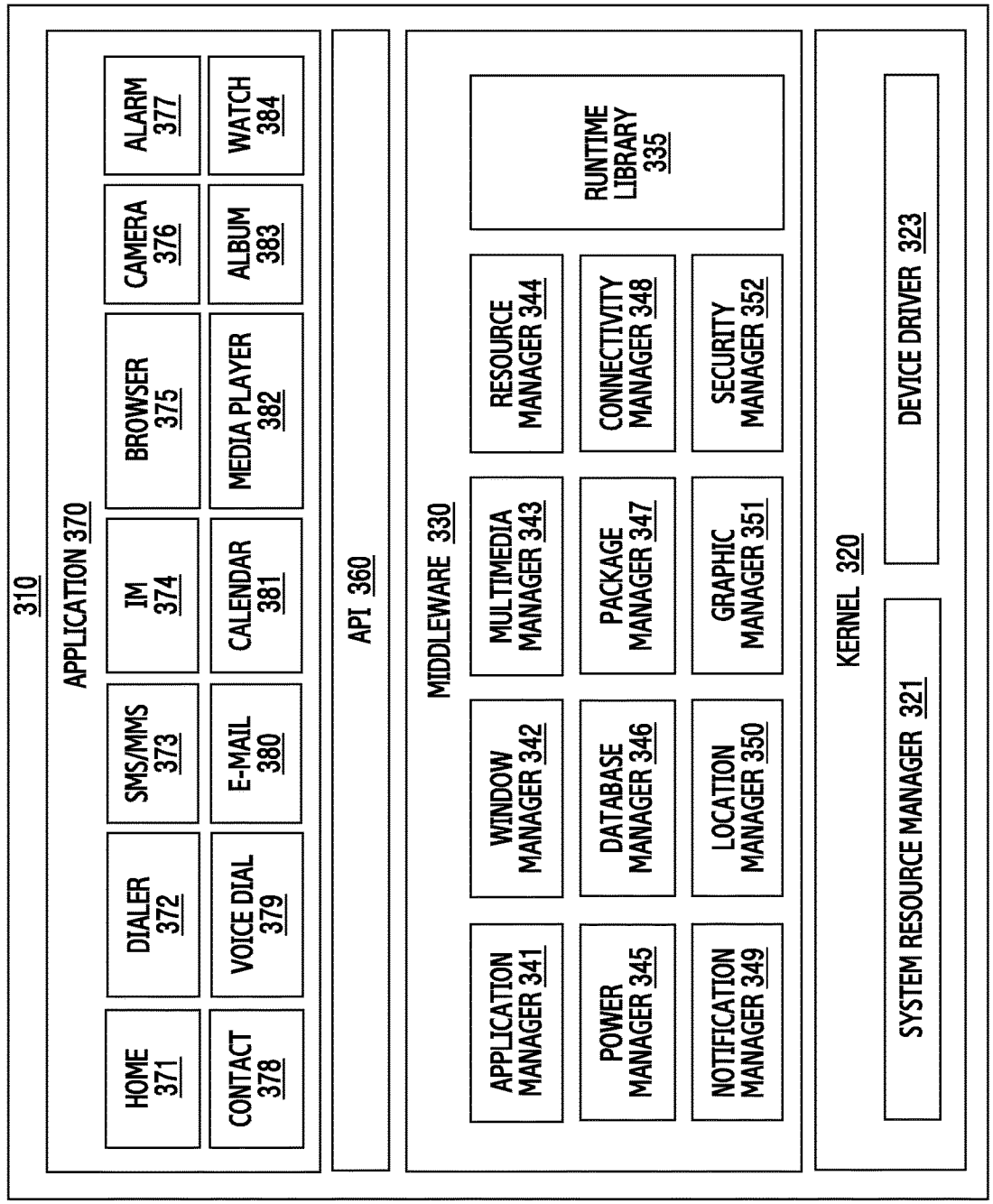
FIG. 3 is a block diagram of a program module according to various embodiments.

FIG. 3 is a block diagram of a program module, according to an embodiment of the present disclosure.

A program module 310 (e.g., the program 140) may include an OS for controlling a resource relating to the electronic device 101 and/or the applications 147 running on the OS. The OS may include, for example, Android™, iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver.

The middleware 330, for example, may provide a function commonly utilized by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, edit or otherwise use a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device.

The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

Figure 4:
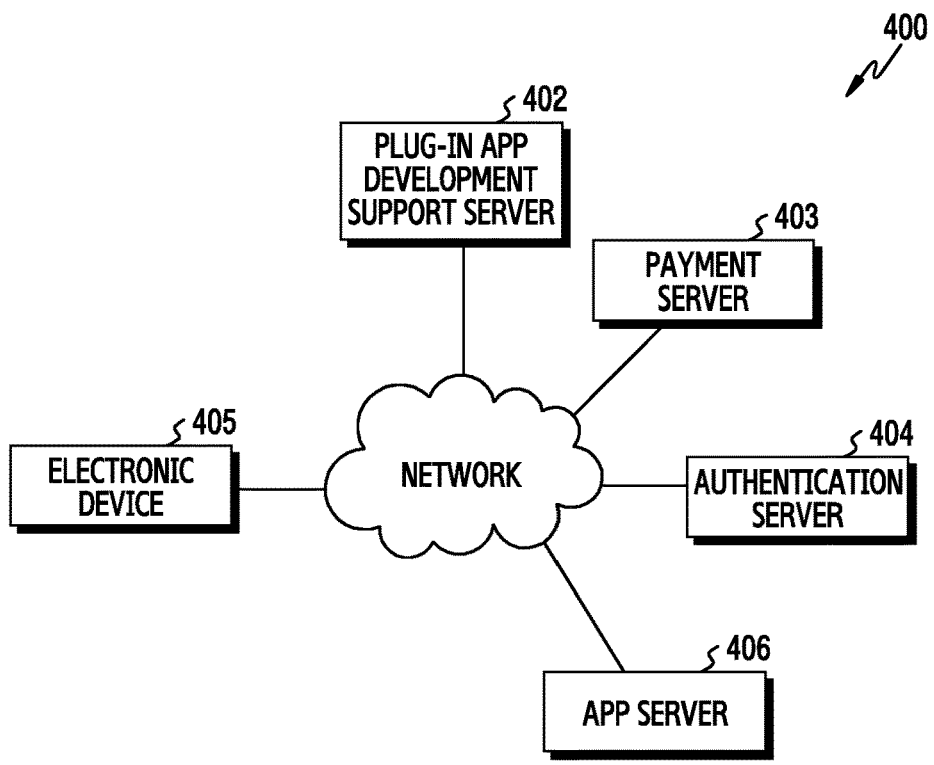
FIG. 4 is a view showing a payment system according to an embodiment of the present disclosure.

FIG. 4 is a view showing a payment system according to an embodiment of the present disclosure.

Referring to FIG. 4, the payment system 400 according to an embodiment of the present disclosure may include a plug-in app development support server 402, a payment server 403, an authentication server 404, an electronic device 405, and an app server 406.

The electronic device 405 (for example, the electronic device 101 of FIG. 1 or the electronic device 201 of FIG. 2) may be communicatively connected (or coupled) with the plug-in app development support server 402, the payment server 403, the authentication server 404, and the app server 406 via a network. The electronic device 405 implementing the payment system 400 may include a payment app for executing a payment service. The payment app may allow at least one plug-in software program (hereinafter, referred to as a plug-in app) to be installed therein (e.g., sometimes referred to as "plugged" or "plugged-in"). For example, the plug-in app may provide various services which are provided by third parties. The plug-in app may be installed as a portion of the payment app.

According to various embodiments of the present disclosure, the electronic device 405 may request the authentication server 404 to authenticate the plug-in app when installing the plug-in app, and may install the plug-in app when it is confirmed that the plug-in app is successfully authenticated. For example, after installing the plug-in app, the electronic device 405 may request the authentication server 404 to authenticate the installed plug-in app, and may add the plug-in app on the payment app when the plug-in app is authenticated. According to an embodiment, prior to installing the plug-in app, the electronic device 405 may request the authentication server 404 to authenticate the plug-in app to be installed, and may install the plug-in app when the plug-in app is successfully authenticated.

According to an embodiment, the electronic device 405 may generation a notification indicating an installable plug-in app, based on a payment means (card or account) registered at the payment app. In another example, the electronic device 405 may generate a notification indicating registration of a payment means, based on the installed plug-in app.

According to an embodiment, the plug-in app development support server 402 may support development of a plug-in app corresponding to or related to the payment app. For example, the plug-in app development support server 402 may include a web page for third parties wishing to develop the plug-in app related to the payment app to request development of the plug-in app and/or to register authentication information. The plug-in app development support server 402 may support development and management (for example, updating) of the plug-in app. In addition, the plug-in app development support server 402 may manage authentication information (for example, version information, a signature, a product identification (ID), a service ID, or the like) of the plug-in app.

According to an embodiment, the plug-in app development support server 402 may further include an authentication key. The authentication key may be issued by a third party or the authentication server 404. The authentication key may be, for example, a symmetric key or an asymmetric key. When the symmetric key is used, the third party may encrypt the service ID (or certain authentication data (for example, a key)), and may insert the encrypted service ID into the plug-in app. When the asymmetric key is used, the third party may add the asymmetric key to the plug-in app. When requesting authentication from the authentication server 404, the electronic device 405 may encrypt the service ID using the asymmetric key, and may transmit the encrypted service ID to the authentication server 404. The authentication server 404 may decrypt the encrypted data received from the electronic device 405 by using the symmetric key or asymmetric key, and may perform authentication.

According to an embodiment, the payment server 403 may provide a payment service. The payment server 403 according to various embodiments of the present disclosure may store information corresponding to the plug-in apps as registered by the third parties. The payment server 403 may transmit a list of plug-in apps to the electronic device 405. According to an embodiment, the payment server 403 may receive a search request for a plug-in app associated with a specific third party (for example, an issuer of a registered card) from the electronic device 405, and may transmit a response including information regarding at least one searched plug-in app to the electronic device 405.

According to an embodiment, the authentication server 404 may store the authentication information of the plug-in app. For example, the authentication server 404 may receive and store authentication information regarding the plug-in app from the plug-in app development support server 402. When authentication of the plug-in app is requested by the electronic device 405, the authentication server 404 may perform authentication by comparing the stored authentication information and authentication information received from the electronic device 405.

According to an embodiment, the app server 406 may store setup files of various apps (e.g., installation executables). For example, the app server 406 may store a setup file of the plug-in app, and may transmit the setup file to the electronic device 405 when detecting a request to download the setup file.

According to an embodiment, at least one of the plurality of servers (for example, the plug-in app development support server 402, the payment server 403, the authentication server 404, and the app server 406) shown in FIG. 4 may be integrated. For example, the authentication server 404 and the payment server 403 may be integrated.

Figure 5:
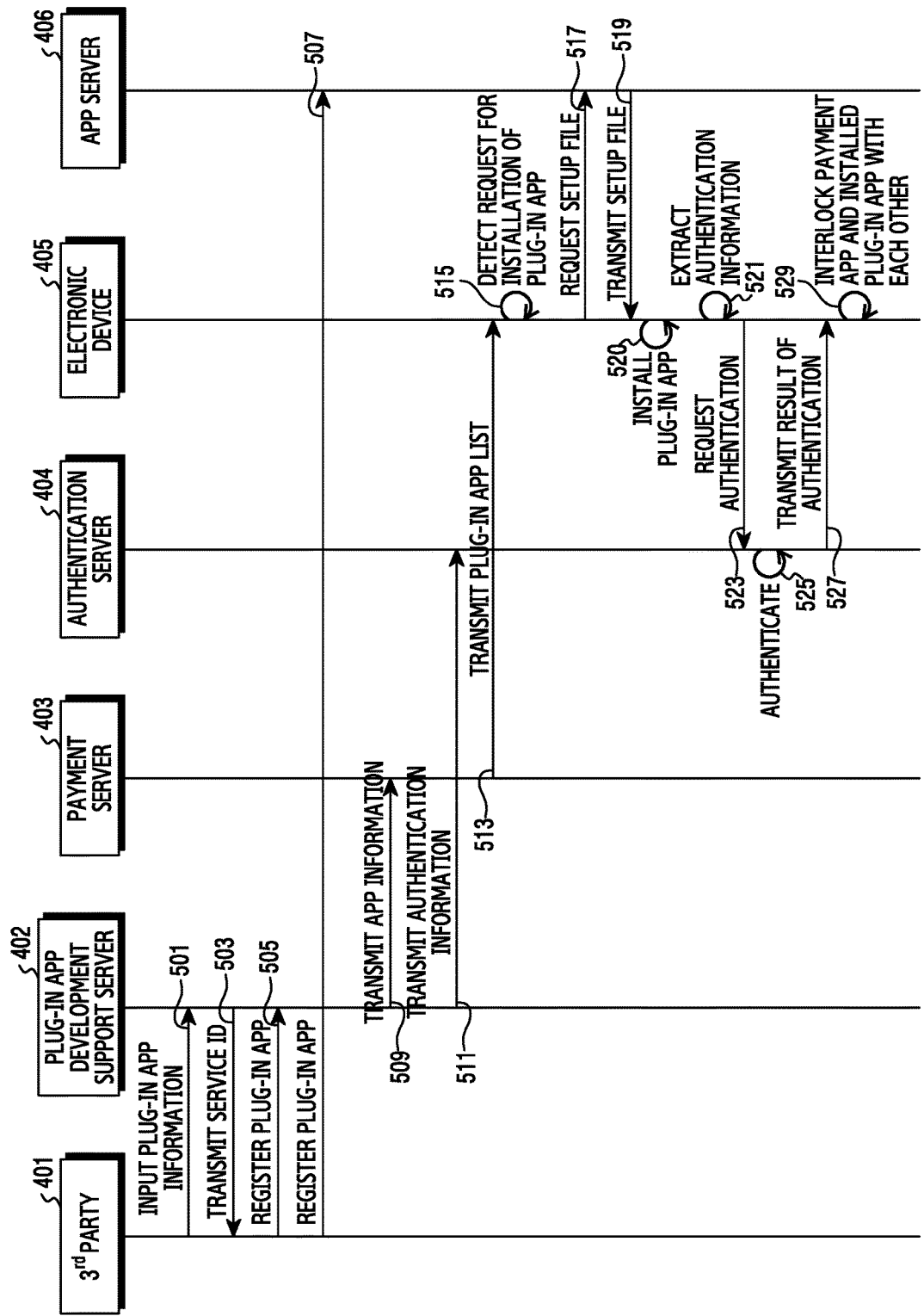
FIG. 5 is a flowchart to illustrate an operation of installing a plug-in app of a payment system according to an embodiment of the present disclosure.

FIG. 5 is a flowchart to explain an operation of installing a plug-in app of a payment system according to an embodiment of the present disclosure.

Referring to FIG. 5, in operation 501, a third party 401 (such as, for example, a card company, a bank, or the like) of an information transaction system (such as, for example, the payment system 400 of FIG. 4) according to an embodiment of the present disclosure may transmit information regarding a plug-in app to be developed (hereinafter, referred to as plug-in app information) to the plug-in app development support server 402. For example, the plug-in app may be installed in a payment app of the electronic device 405 in the form of plug-in.

According to an embodiment of the present disclosure, in operation 503, the plug-in app development support server 402 may transmit a service ID utilized for development of the plug-in app and a plug-in software development kit (SDK) for development of the plug-in app to the third party 401. According to an embodiment, the plug-in development support server 402 may transmit an authentication key (for example, a symmetric key or an asymmetric key) to the third party 401.

According to an embodiment of the present disclosure, the third party 401 may develop the plug-in app using the service ID and the SDK. According to an embodiment, the third party 401 may encrypt the service ID (or certain data) using the symmetric key, and insert the service ID into the plug-in app. According to another embodiment, the third party 401 may add the asymmetric key for encrypting the service ID when there is a request for authentication to the plug-in app.

When the development of the plug-in app is complete, the third party 401 may register the developed plug-in app at the plug-in app development support server 402 in operation 505. In operation 507, the third party 401 may register the developed plug-in app at the app server 406.

According to an embodiment of the present disclosure, when the plug-in app is registered, in operation 509, the plug-in app development support server 402 may transmit information regarding the plug-in app (app information) (such as, for example, a name, an icon, a version, a location of an app setup file, etc.), and information utilized for authentication (hereinafter referred to as "authentication information") to the payment server 403. Similarly, in operation 511, the plug-in development support server 502 may transmit authentication information for the plug-in app to the authentication server 404. The authentication information may include version information, a digital signature and/or a service ID. According to an embodiment, the authentication information may further include a product ID.

According to an embodiment, in operation 509, the plug-in development support server 402 may transmit the app information and the authentication information to the payment server 403. In operation 511, the plug-in development support server 402 may transmit the app information and the authentication information to the authentication server 404.

According to an embodiment of the present disclosure, in operation 513, the payment server 403 may transmit a plug-in app list to the electronic device 405. For example, the payment server 403 may transmit the plug-in app list to the electronic device 405 periodically, in response to a detected user request (such as, for example, selection of a plug-in app menu of the payment app) and/or when the plug-in app list is updated.

According to an embodiment of the present disclosure, in operation 515, the electronic device 405 may detect a request for installation of the plug-in app. The installation of the plug-in app may be requested by various methods (such, for example, usage of an installation menu of the payment app, by a push message, or a notification bar, etc.). A detailed description thereof will be provided below.

According to an embodiment of the present disclosure, in operation 517, the electronic device 405 may request a setup file from the app server 406 when detecting the request for the installation of the plug-in app. According to an embodiment of the present disclosure, in operation 519, the app server 406 may transmit the requested setup file to the electronic device 405.

According to an embodiment of the present disclosure, in operation 520, the electronic device 405 may install the plug-in app using the setup file. The plug-in app in operation 520 may be installed as a temporary installation, for example. The temporary installation may indicate that the plug-in app is installed in the electronic device 405, but is not aggregated (or integrated) with the payment app. For example, the temporary installation may indicate that the plug-in app is installed, but is not available for use by the user until authentication is successfully completed.

According to an embodiment of the present disclosure, in operation 521, the electronic device 405 may extract authentication information from the installed plug-in app. The authentication information may include version information, a signature, a service ID, a product ID, or data encrypted with an authentication key. According an embodiment, the authentication information may include version information, a signature, and a service ID. According to an embodiment, the authentication information may be encrypted by using an authentication key (for example, a symmetric key or an asymmetric key).

According to an embodiment of the present disclosure, in operation 523, the electronic device 405 may transmit a request to the authentication server 404 to authenticate the installed plug-in app. For example, the electronic device 405 may transmit the extracted authentication information to the authentication server 404. According to an embodiment, when the authentication information includes an asymmetric key, the electronic device 405 may encrypt at least a portion (service ID) of the authentication information by using the asymmetric key, and may transmit the encrypted information to the authentication server 404.

According to an embodiment of the present disclosure, the authentication server 404 may perform authentication in operation 525. For example, the authentication server 404 may determine whether the authentication information (hereinafter, first authentication information) received in operation 511 and the authentication information (hereinafter, second authentication information) received in operation 523 match each other. For example, the authentication server 404 may determine whether version information, signatures, and/or product IDs of the first authentication information and the second authentication information match each other. According to an embodiment, the authentication server 404 may determine whether version information, signatures, and/or service IDs of the first authentication information and the second authentication information match each other. According to an embodiment, when the first authentication information and/or the second authentication information is encrypted by using the authentication key, the authentication server 404 may decrypt the first authentication information and/or the second authentication information encrypted by using the corresponding authentication key, and may perform authentication by using the decrypted first authentication information and/or second authentication information.

According to an embodiment of the present disclosure, the authentication server 404 may transmit a result of authentication to the electronic device 405 in operation 527. According to an embodiment of the present disclosure, when the result of authentication received from the authentication server 404 indicates an authentication allowance or success, the electronic device 405 may aggregate (or integrate) the payment app and the installed plug-in app in operation 529. For example, the payment app of the electronic device 405 may request the installed plug-in app to app-interlock (or connect) therewith. The installed plug-in app may transmit a response signal including the service ID to the payment app. The payment app which receives the response signal may compare the service ID of the plug-in app received from the payment server 403 and the service ID included in the response signal. When the service IDs match each other as a result of comparing, the payment app may add an icon of the installed plug-in app to a home screen of the payment app. That is the plug-in app is added on the payment app.

In another embodiment, when the result of authentication received from the authentication server 404 indicates an authentication failure although it is not illustrated, the electronic device 405 may uninstall the plug-in app.

According to an embodiment, the authentication may be performed before the plug-in app is installed, and, when the authentication is completed, the plug-in app may be installed. For example, the electronic device 405 may perform authentication to determine whether to install the plug-in app by using information extractable from the setup file (for example, version information, a product ID, a service ID, and/or data encrypted with an authentication key). For example, operation 520 of FIG. 5 may be omitted and an operation of installing the plug-in app may be added before operation 529.

According to an embodiment, the payment server 403 may store the setup file of the plug-in app. For example, the payment server 403 may include at least a portion of the functions of the app server 406 (for example, a function of storing the setup file of the plug-in app).

Figure 6:
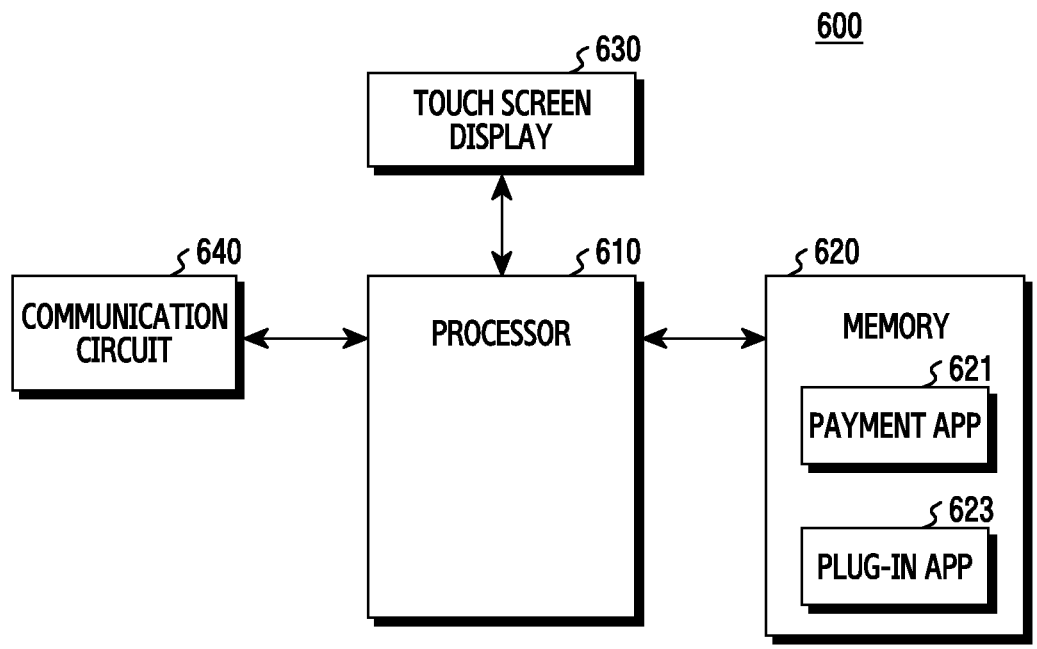
FIG. 6 is a block diagram showing a configuration of an electronic device according to an embodiment of the present disclosure.

FIG. 6 is a block diagram illustrating a configuration of an electronic device according to an embodiment of the present disclosure.

Referring to FIG. 6, an electronic device 600 (for example, the electronic device 101 of FIG. 1, the electronic device 201 of FIG. 2, or the electronic device 405 of FIGS. 4 and 5) according to an embodiment of the present disclosure may include a processor 610 (for example, the processor 120 of FIG. 1, the processor 210 of FIG. 2), a memory 620 (for example, the memory 130 of FIG. 1, the memory 230 of FIG. 2), a display 630 (for example, the display 160 of FIG. 1, the display 260 of FIG. 2), and a communication circuit 640 (for example, the communication interface 170 of FIG. 1, the communication module 220 of FIG. 2). The electronic device 600 may include a housing (not shown) including a first surface and a second surface facing the first surface. The housing may be a case surrounding the electronic device 600.

According to an embodiment, the processor 610 may control an overall operation of the electronic device 600. For example, the processor 610 may be disposed inside the housing surrounding the electronic device 600, and may be functionally (operatively, or electrically) connected with the touch screen display 630 and the communication circuit 640 to control the respective elements of the electronic device 600. The processor 610 may be functionally (operatively, or electrically) connected with the memory 620, and may control the respective elements according to instructions stored in the memory 620 to perform various functions. The processor 610 may be provided as a central processing unit (CPU), an application processor (AP), a micro control unit (MCU), or a micro processor unit (MPU). The processor 610 may be provided as a signal core processor or a multi-core processor. In another embodiment, the processor 610 may be a multi-processor including a plurality of processors. For example, the processor 610 may include an application processor and a communication processor (CP). In another embodiment, the processor 610 may include a high-power processor (for example, an AP) and a low-power processor (for example, an MCU, an MPU).

According to various embodiments of the present disclosure, the processor 610 may control an operation of installing a plug-in app as a portion of a payment app. For example, when the processor 610 detects a request for installation of a plug-in app, the processor 610 may install the plug-in app (for example, temporary installation), and, when the installed plug-in app is authenticated through an authentication server, the processor 610 may aggregate (or integrate) the plug-in app and the payment app with each other. The processor 610 may induce (inform) installation of the installable plug-in app based on a payment means (for example, card or account information) registered in the payment app. The processor 610 may induce (inform) installation of a plug-in app based on a request for execution of a function that utilizes a plug-in app which is not installed. The processor 610 may induce (inform) registration of a payment means related to the installed plug-in app. A detailed description thereof will be provided with reference to FIGS. 7 to 13.

According to various embodiments of the present disclosure, the memory 620 may be disposed inside the housing, and may be functionally (or electrically) connected with the processor 610. The memory 620 may store various programs, and may store data generated while the various programs are being executed, or downloaded data. The memory 620 may store various commands and/or one or more instructions for operating the processor 610. The memory 620 may include at least one of an internal memory or an external memory.

According to various embodiments of the present disclosure, the memory 620 may store various program modules to control installation of a plug-in app related to the payment app of the electronic device 600, induction of installation of an installable plug-in app, or induction of registration of a payment means. The memory 620 may store a payment app 621 and a plug-in app 623. According to an embodiment, the payment app 621 may provide a mobile payment service. The plug-in app 623 may provide services of various third parties that may be provided by interworking with a mobile payment service. The plug-in app 623 may be installed in the payment app 621 and may operate as being included in the payment app 621. The plug-in app 623 may be installed as a portion of the payment app 621 when the plug-in app 623 is authenticated by an authentication server (for example, the authentication server 404). The payment app 621 and the plug-in app 623 may communicate with each other via various interfaces (for example, an android interface definition language (AIDL)).

According to various embodiments, the touch screen display 630 may be exposed through the first surface of the housing, and may provide an input function and an output function. For example, the touch screen display 630 may include a touch panel and a display panel. The display panel may be implemented by using a liquid crystal display (LCD), a light emitting diode (LED) display, an organic LED (OLED) display, or a micro electro mechanical system (MEMS) display, or an electronic paper display. The touch panel may detect (or recognize) a change in a physical property (for example, capacitance, frequency, etc.) caused by various touch inputs (for example, tap, double tap, touch, touch and drag, multi-touch, force touch, or the like) using an input tool such as a finger, a stylus, an electronic pen, or the like, and may transmit the change to the processor 610. The touch panel may include a first panel (not shown) for detecting a touch using a finger, a second panel (not shown) for recognizing an electronic pen, and/or a third panel (not shown) for detecting a force.

According to various embodiments of the present disclosure, the touch screen display 630 may display various user interfaces for installing a plug-in app, authenticating, inducing installation, or inducing registration of a payment means, and may receive various user inputs. The various user interfaces will be described below with reference to FIGS. 8A to 13.

According to various embodiments of the present disclosure, the communication circuit 640 may be positioned inside the housing, and may perform wire communication and/or wireless communication. For example, the communication circuit 640 may include at least one wireless communication circuit (for example, mobile communication, WiFi communication, and/or Bluetooth communication), and/or at least one wire communication circuit (for example, a high definition multimedia interface (HDMI), a display port (DP), or a universal serial bus (USB), etc.).

According to various embodiments of the present disclosure, the communication circuit 640 may transmit and receive signals (or data) to or from at least one of a plurality of servers (for example, the plug-in app development support server 402, the payment server 403, the authentication server 404, and the app server 406) in order to install or authenticate the plug-in app, to induce installation, or induce registration of a payment means.

According to various embodiments of the present disclosure, an electronic device (e.g., the electronic device 101 of FIG. 1, the electronic device 201 of FIG. 2, the electronic device 405 of FIGS. 4 and 5, or the electronic device 600 of FIG. 6) may comprise a housing; a touch screen display (e.g., the display 160 of FIG. 1, the display 260 of FIG. 2, or the touch screen display 630 of FIG. 6) exposed through a portion of the housing; a wireless communication circuit (e.g., the communication interface 170 of FIG. 1, the communication module 220 of FIG. 2, or the communication circuit 640 of FIG. 6) disposed inside the housing; a processor (e.g., the processor 120 of FIG. 1, the processor 210 of FIG. 2, or the processor 610 of FIG. 6) disposed inside the housing and operatively connected with the display and the communication circuit; and a memory (e.g., the memory 130 of FIG. 1, the memory 230 of FIG. 2, or the memory 620 of FIG. 6) disposed inside the housing and operatively connected with the processor, such that the memory stores an application program for performing a payment through the electronic device, and stores instructions that, when being executed, cause the processor to: receive a first user input indicating a transaction card associated with an issuer ID (identification) through the display; store information regarding the transaction card associated with the application program; transmit, to a first external server (e.g., the payment server 403 of FIGS. 4 and 5) through the communication circuit, a request for a search for a plug-in software program associated with the issuer ID; receive, from the first external server through the communication circuit, a response comprising information regarding at least one searched plug-in software program; provide a user interface for installing the at least one plug-in software program on the display; receive a second user input through the user interface for installing the at least one plug-in software program; transmit an access request of the at least one plug-in software program to a second external server (e.g., the app server 406 of FIGS. 4 and 5) through the communication circuit; download the at least one plug-in software program from the second external server through the communication circuit; install the at least one plug-in software program as a portion of the application program; perform authentication regarding the installed at least one plug-in software program; and based at least in part on a result of the authentication, complete the installation of the at least one plug-in software program.

According to various embodiments, the instructions cause the processor to detect a request for a function execution through a menu of the application program or a voice input; identify whether the requested function utilizes installation of a plug-in software program related to the application program; and when the installation is utilized, provide a user interface for identifying whether to install.

According to various embodiments, the instructions cause the processor to install the plug-in software program which is requested to be installed, and then to execute the requested function.

According to various embodiments, when performing the authentication, the instructions cause the processor to extract at least one of a signature, a version, or a service ID of the installed plug-in software program; transmit the extracted at least one of the signature, the version, or the service ID to a third external server; and receive a result of the authentication from the third external server.

According to various embodiments, the instructions cause the processor to, when the authentication fails, uninstall the installed at least one plug-in software program.

According to various embodiments, the instructions cause the processor to add at least one icon corresponding to the installed at least one plug-in software program to a home screen of the application program.

According to various embodiments, the instructions cause the processor to receive, from the first external server, a push message comprising information regarding at least one new plug-in software program related to the application program, or update information regarding the installed at least one plug-in software program; and when the push message is selected, provide a user interface for installing the at least one new plug-in software program or for updating the installed at least one plug-in software program on the display.

According to various embodiments, such that the instructions cause the processor to receive a request for registration of a payment means related to the installed at least one plug-in software program; and when receiving the request for the registration, provide a user interface informing a user of necessity of registering the payment means.

According to various embodiments, the instructions cause the processor to receive a request for registration of a payment means related to the installed at least one plug-in software program; and provide a user interface for registering the payment means in response to the request for the registration being received.

According to various embodiments, the instructions cause the processor to register the payment means at least one of the installed at least one plug-in software program or the application program.

Figure 7:
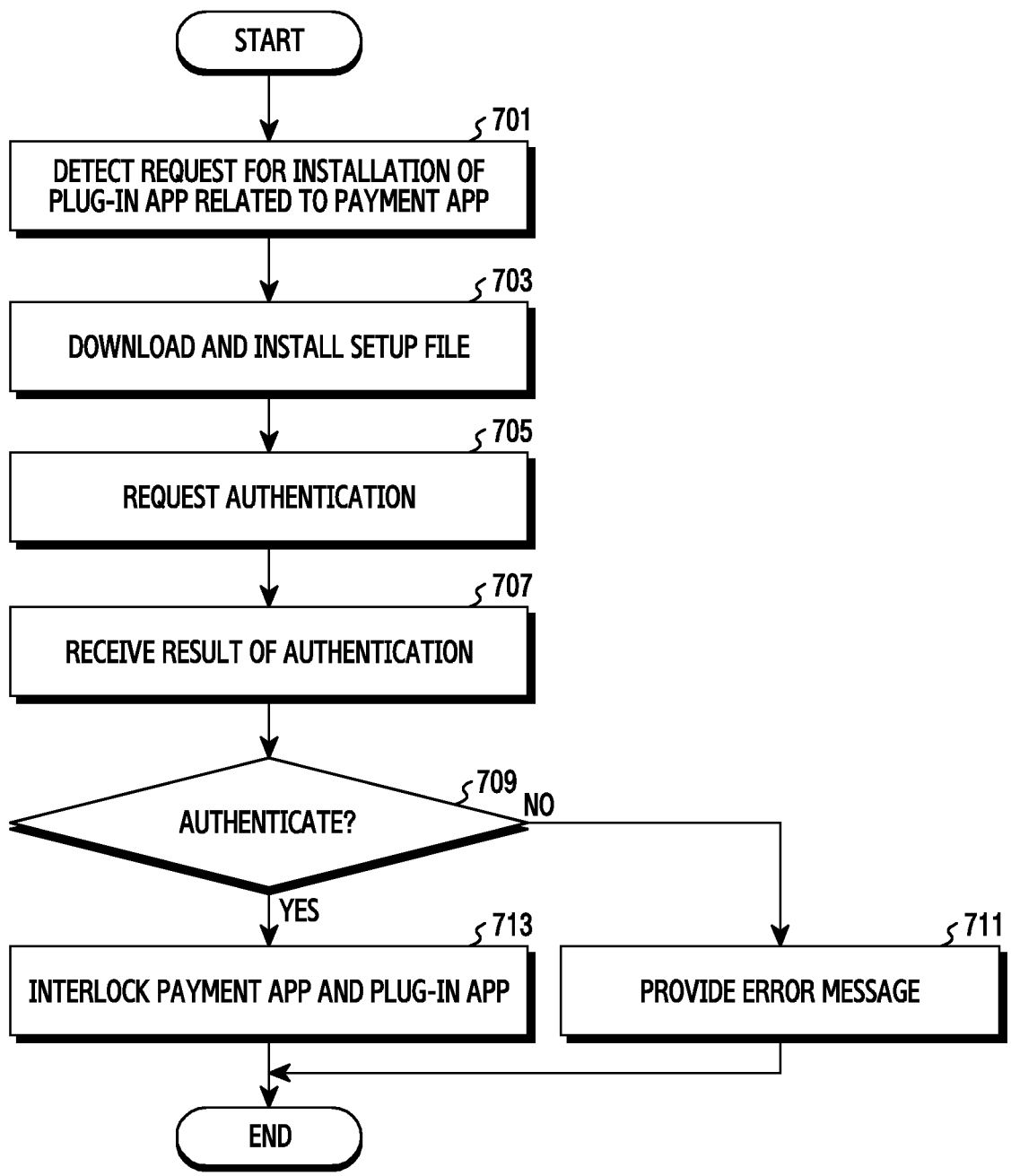
FIG. 7 is a flowchart showing an operation of installing a plug-in app of an electronic device according to an embodiment of the present disclosure.

FIG. 7 is a flowchart showing an operation of installing a plug-in app of an electronic device according to an embodiment of the present disclosure.

Referring to FIG. 7, in operation 701, a processor (for example, the processor 120 of FIG. 1, the processor 210 of FIG. 2, the processor 610 of FIG. 6) of an electronic device (for example, the electronic device 101 of FIG. 1, the electronic device 201 of FIG. 2, the electronic device 405 of FIGS. 4 and 5, the electronic device 600 of FIG. 6) according to an embodiment of the present disclosure may detect a request for installation of a plug-in app associated with a payment app. The installation of the plug-in app may be requested using various methods. The request for the installation of the plug-in app will be described in detail below with reference to FIGS. 8A to 11.

According to various embodiments of the present disclosure, in operation 703, the processor may download and install a setup file of the plug-in app to be installed. For example, the processor may request the setup file from an app server (for example, the app server 406 of FIGS. 4 and 5) through a communication circuit (for example, the communication interface 170 of FIG. 1, the communication module 220 of FIG. 2, the communication circuit 640 of FIG. 6), and may receive the setup file from the app server and may install the plug-in app. For example, the installation of the plug-in app may be temporary installation.

According to various embodiments of the present disclosure, in operation 705, after completing the temporary installation of the plug-in app, the processor may request authentication of the plug-in app. For example, the processor may extract a version, a signature, and/or a product ID of the installed plug-in app, and may transmit the extracted information to an authentication server (for example, the authentication server 404 of FIGS. 4 and 5) through the communication circuit. According to an embodiment, the processor may extract a version, a signature, and/or a service ID of the installed plug-in app, and may transmit the extracted information to the authentication server.

According to various embodiments of the present disclosure, authentication may be requested by the payment app. For example, the payment app may request authentication information from the plug-in app by using an API (for example, an AIDL) included in an SDK, and may receive the authentication information from the plug-in app. The payment app may transmit the received authentication information to the authentication server to request the authentication.

According to various embodiments of the present disclosure, in operation 707, the processor may receive a result of authentication. For example, the result may indicate whether the plug-in app is authenticated or not authenticated, as indicated by data received from the authentication server through the communication circuit.

According to various embodiments of the present disclosure, in operation 709, the processor may identify the received result of authentication. When the authentication is indicated as failure in operation 709, the processor may generate an error message in operation 711. For example, the processor may display an error message saying "The plug-in app cannot be installed due to an authentication error." on a particular region of a display (for example, the display 160 of FIG. 1, the display 260 of FIG. 2, or the touch screen display 630 of FIG. 6). According to an embodiment, the processor may output an error sound or an error message through a speaker. Further, the processor may uninstall the plug-in app and terminate the installation operation.

When the authentication succeeds as a result of identifying in operation 709, the processor may aggregate (or "integrate," "interlock") the payment app and the installed plug-in app with each other in operation 713 such that the plug-in app is fully functional within the operations of the app, including display of a graphic element indicating the same. For example, the payment app may add an icon of the installed plug-in app to a certain region of its own home screen.

According to an embodiment, the processor may request authentication prior to installing the plug-in app, and may install the plug-in app when authentication succeeds. The operation of installing the plug-in app in operation 703 of FIG. 7 may be performed before operation 713.

FIGS. 8A to 8D are views showing an example screen illustrating a method for installing a plug-in app by using a payment app according to an embodiment of the present disclosure.

Referring to FIGS. 8A to 8D, a processor (for example, the processor 120 of FIG. 1, the processor 210 of FIG. 2, the processor 610 of FIG. 6) of an electronic device (for example, the electronic device 101 of FIG. 1, the electronic device 201 of FIG. 2, the electronic device 405 of FIGS. 4 and 5, the electronic device 600 of FIG. 6) according to an embodiment of the present disclosure may control a display (for example, the display 160 of FIG. 1, the display 260 of FIG. 2, the touch screen display 630 of FIG. 6) to display a home screen as shown in view 811 when a payment app (such as, for example, Samsung Pay™) is executed. The home screen may include, for example, a title display region 801, a promotion image display region 802, and/or an icon display region 803.

According to an embodiment, the title display region 801 may include a text and/or logo indicating the title of the payment app. In another example, the title display region 801 may include a menu on one side (for example, the end of the right side).

According to an embodiment, the promotion image display region 802 may display advertising or event information. The promotion image display region 802 may include, for example, a plurality of pages, and may facilitate animated transitions or inputs to transition between the pages, such as a slide in a specific direction (for example, a horizontal direction). For example, the promotion image display region 802 may include three pages as shown in view 811.

According to an embodiment, the icon display region 803 may include at least one shortcut icon 803-1 for directly executing various menus of the payment app, and a plug-in app list icon 803-2 for requesting display of a plug-in app list. The icon display region 803 may be, for example, a region that is scrollable in a specific direction (for example, a vertical direction).

According to an embodiment, when the plug-in app list icon 803-2 of the home screen is selected (for example, a touch input), the processor may control the display to display a plug-in app list screen as shown in view 813. The plug-in app list may include at least one installable plug-in app, and each item of the list may include an installation menu 804 on a region.

According to an embodiment, when selection (for example, touch) of the promotion image display region 802 of the home screen is detected, the processor may control the display to display the plug-in app list screen. The plug-in app list screen may be, for example, a plug-in app list related to the promotion image. For example, when a promotion image of bank "A" is selected, the processor may control the display to display a plug-in app list related to bank "A."

According to an embodiment, when one plug-in app is related to the promotion image, the processor may control the display to display a detailed screen of the plug-in app as shown in view 815. The detailed screen may include an installation menu 805 on a region, and may include an icon, a version, an explanation, a size, developer information, etc. regarding the plug-in app.

Figure 8B:
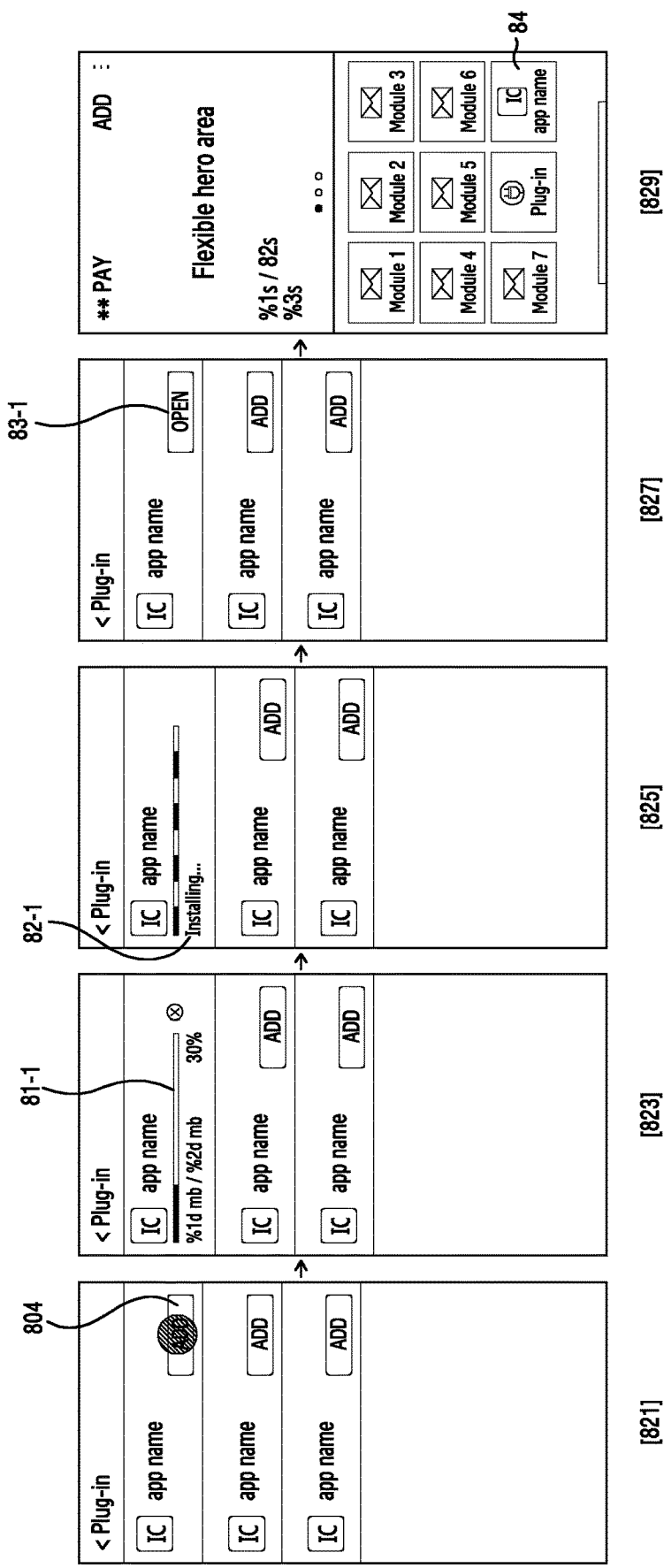

Referring to FIG. 8B, the processor of the electronic device according to an embodiment of the present disclosure may proceed with installation of the plug-in app on the plug-in app list screen. For example, when an installation menu 804 of a specific item of the plug-in app list is selected as shown in view 821, the processor may download the corresponding plug-in app. The processor may visually indicate a progress state of downloading of the corresponding plug-in app by, for example, displaying a bar type graph 81-1, as shown in view 823. When the downloading of the plug-in app is completed, the processor may begin installing the plug-in app, and may visually notify that the plug-in app is being installed (for example, may display a text 82-1 saying "Installing") as shown in view 825. When the installation of the plug-in app is completed, the processor may perform authentication. For example, the payment app of the electronic device may request authentication information from the plug-in app, and may receive the authentication information from the plug-in app. The payment app may transmit the received authentication information to an authentication server (for example, the authentication server 404 of FIGS. 4 and 5) to request authentication.

According to an embodiment, when the authentication of the plug-in app is completed, the processor may change the installation menu 804 to an execution menu 83-1 as shown in view 827. When returning to the home screen is requested (for example, a cancel key is inputted) in the state as shown in view 827, the processor may control the display to display the home screen as shown in view 829. For example, the processor may add an icon 84 of the installed plug-in app to the icon display region 803 of the home screen.

According to an embodiment, when the authentication fails, the processor may uninstall the plug-in app.

Various embodiments of the present disclosure described above may aggregate (or "integrate", "interlock") an app of a third party with the payment app in the form of plug-in, such that a user can conveniently and easily use various functions through the payment app and thus user's convenience can be enhanced. For example, when a user wants to do an account transfer while executing the payment app, various embodiments of the present disclosure may provide a list of plug-in apps (for example, bank apps) enabling the account transfer without escaping from the payment app and executing a corresponding bank app separately as in a related-art method, such that the user can select one of the plug-in apps and can do the account transfer.

Figure 8C:
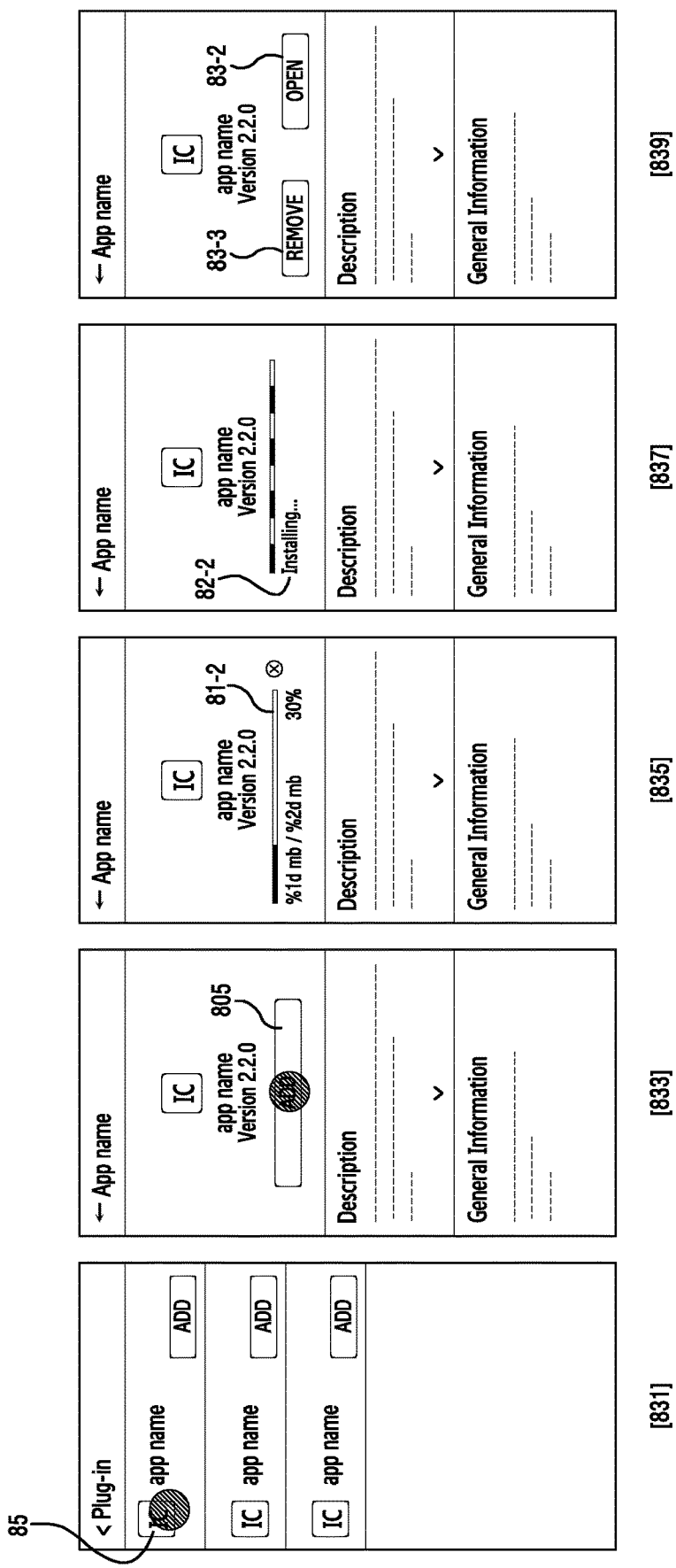

Referring to FIG. 8C, the processor of the electronic device according to an embodiment of the present disclosure may proceed with installation of a plug-in app on a detailed screen. For example, when a plug-in app list is displayed as shown in view 831 and an icon 85 of a specific plug-in app is selected, the processor may control the display to display a detailed screen of the selected plug-in app as shown in view 833.

According to an embodiment, when an installation menu 805 is selected on the detailed screen, the processor may download the corresponding plug-in app. The processor may visually notify of a progress state of downloading of the corresponding plug-in app (for example, may display a bar type graph 81-2), as shown in view 835. When the downloading of the plug-in app is completed, the processor may start installing the plug-in app, and may visually notify that the plug-in app is being installed (for example, may display a text 82-2 saying "Installing") as shown in view 837. When the installation of the plug-in app is completed, the processor may perform authentication. For example, the payment app of the electronic device may request authentication information from the plug-in app, and may receive the authentication information from the plug-in app. The payment app may transmit the received authentication information to an authentication server (for example, the authentication server 404 of FIGS. 4 and 5) to request authentication. When the authentication is completed, the processor may change the installation menu 805 to an execution menu 83-2 and a removal menu 83-3 as shown in view 839. According to an embodiment, when the authentication fails, the processor may uninstall the plug-in app.

Figure 8D:
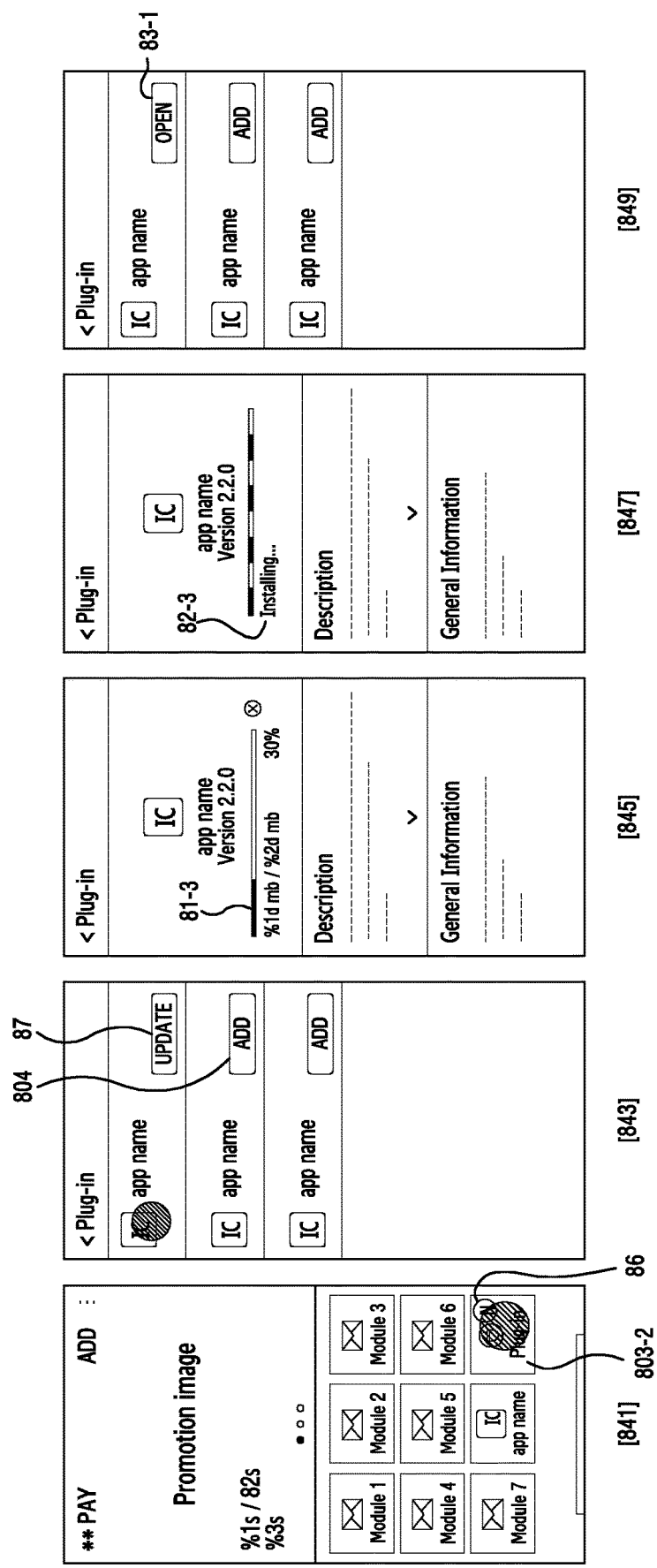

Referring to FIG. 8D, the processor of the electronic device according to an embodiment of the present disclosure may control updating of the plug-in app. For example, when there is an update of the installed plug-in app, the processor may notify that there exists the update in various methods. For example, as shown in view 841, the processor may control to display a mark (or a badge) 86 informing that there exists the plug-in app to be updated on a region of the plug-in app list icon 803-2 of the home screen.

According to an embodiment, when the plug-in app list icon 803-2 of the home screen is selected (for example, is touched), the processor may control the display to display the plug-in app list screen as shown in view 843. Each item of the plug-in app list may include an update menu 87 when an update is requested or scheduled, and may include the installation menu 804 when installation is requested or scheduled.

According to an embodiment, when the update menu 87 is selected (for example, is touched) in view 843, the processor may update by downloading the corresponding plug-in app. The processor may visually notify of a progress state of downloading of the corresponding plug-in app (for example, may display a bar type graph 81-3), as shown in view 845. When the downloading of the plug-in app is completed, the processor may start updating (installing) the plug-in app, and may visually notify that the plug-in app is being installed (for example, may display a text 82-3 saying "Installing") as shown in view 847.

According to an embodiment, when the updating (or installation) of the plug-in app is completed, the processor may perform authentication. For example, the payment app of the electronic device may request authentication information from the plug-in app, and may receive the authentication information from the plug-in app. The payment app may transmit the received authentication information to an authentication server (such as, for example, the authentication server 404 of FIGS. 4 and 5) to request authentication. When the authentication is completed, the processor may change the update menu 87 to the execution menu 83-1 as shown in view 849. According to an embodiment, when the authentication fails, the processor may cancel the updating of the plug-in app.

According to an embodiment, when the installed plug-in app is updated, the authentication may be omitted.

The plug-in app may be updated in various methods. For example, the electronic device according to various embodiments of the present disclosure may notify of the updating of the plug-in app through a notification bar, a notification panel, or a pop-up window, and may proceed with updating when the updating is approved.

According to an embodiment, the processor may add an icon corresponding to a plug-in app of at least a portion included in the list of installable plug-in apps to the home screen, and may display an installation menu on a region of the added icon. For example, when there is an icon of a plug-in app that is not installed, the processor may display an installation menu instead of the mark 86.

Figure 9A:
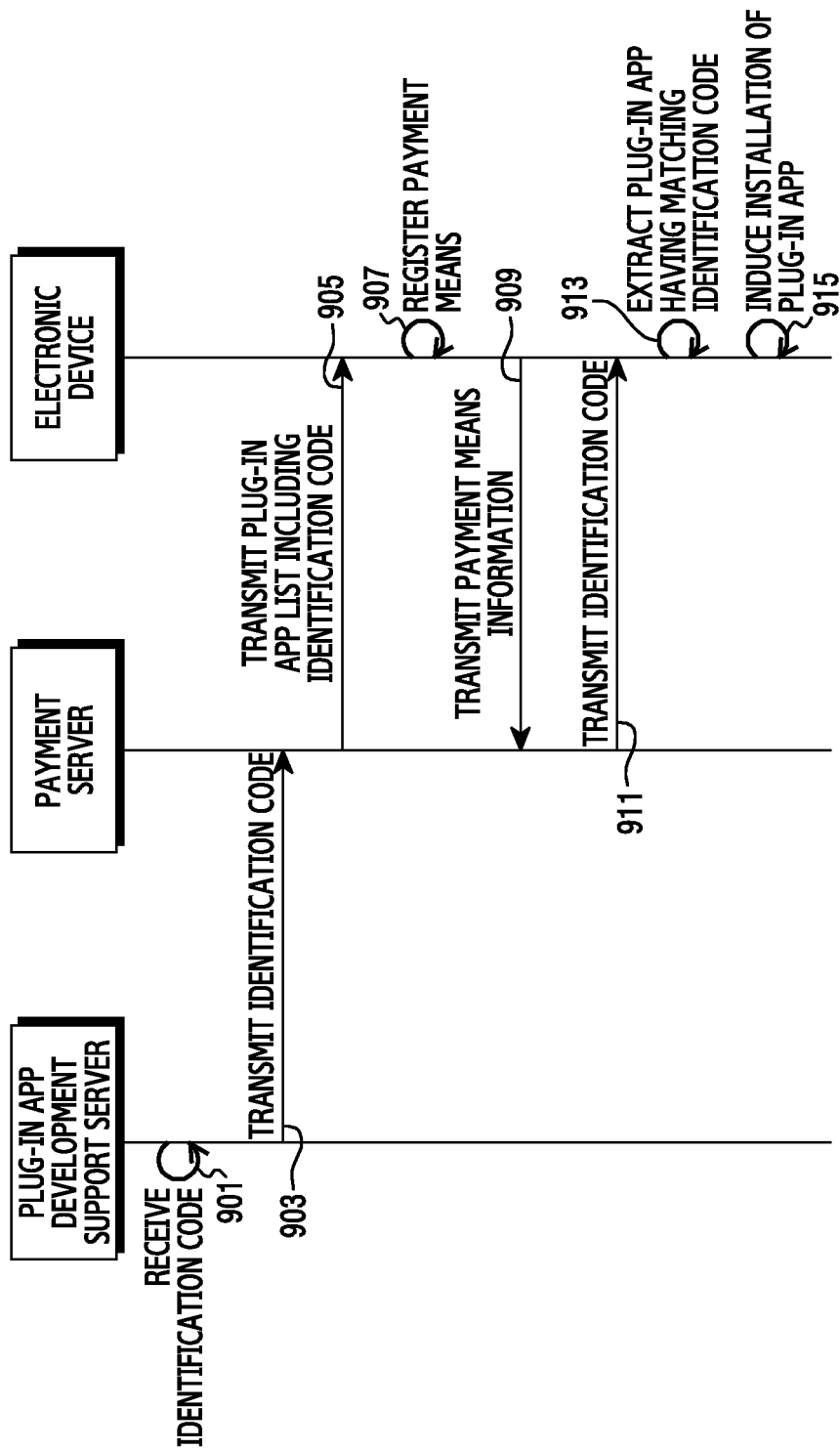
FIG. 9A is a flowchart showing a method for installing a plug-in app by using registration of a payment means according to an embodiment of the present disclosure.

FIG. 9A is a flowchart showing a method for installing a plug-in app by using registration of a payment means according to an embodiment of the present disclosure.

Referring to FIG. 9A, in operation 901, third parties (for example, the third party 401 of FIG. 4) (for example, a card company, a bank, etc.) according to various embodiments of the present disclosure may register an identification code (for example, an issuer code, an issuer ID) at a plug-in app development support server (for example, the plug-in app development support server 402 of FIGS. 4 and 5) when developing or registering a plug-in app. For example, the identification code may be information for distinguishing the plurality of third parties. The identification code may be, for example, a code that is agreed (designated) for a financial institution (for example, a card company, a bank, etc.) or enterprise (for example, a membership enterprise, etc.) in each country. In another example, the identification code may be a code that is generated and managed by a payment server.

According to an embodiment of the present disclosure, in operation 903, the plug-in app development support server may transmit the identification code to a payment server (for example, the payment server 403 of FIGS. 4 and 5). For example, the plug-in app development support server may transmit the identification code to the payment server along with information of the plug-in app (app information).

According to an embodiment of the present disclosure, in operation 905, the payment server may transmit a plug-in app list including the identification code to an electronic device (for example, the electronic device 101 of FIG. 1, the electronic device 201 of FIG. 2, the electronic device 405 of FIGS. 4 and 5, the electronic device 600 of FIG. 6).

According to an embodiment of the present disclosure, in operation 907, the electronic device may detect registration of a payment means (such as, for example, a credit card, a debit card, a bank account, etc.). For example, the electronic device may receive an input of information of the payment means (such as, for example, a card number, an expiration date, a password, an account number, a user name, a resident registration number, etc.) through a payment means regis-tration menu of the payment app. In another example, the electronic device may automatically recognize at least a portion of the card information through a card image photographed through a camera.

According to an embodiment of the present disclosure, in operation 909, the electronic device may transmit the information of the registered payment means to the payment server (and/or a server of the third party).

According to an embodiment of the present disclosure, in operation 911, the payment server may transmit an identification code regarding the registered payment means to the electronic device. According to an embodiment, the payment server may also transmit an identification code of another third party related to the identification code. For example, when a credit card of an "A card company" is registered, the payment server may also transmit an identification code of an "A bank" which is an affiliate of the "A card company."

According to an embodiment of the present disclosure, in operation 913, the electronic device may extract a plug-in app having an identification code matching the received identification code from the received plug-in app list. According to an embodiment, the electronic device may extract a plug-in app that is not installed from among the plug-in apps having the matching identification code.

According to an embodiment of the present disclosure, in operation 915, the electronic device may initiate (e.g., "induce") installation of the extracted plug-in app. For example, the electronic device may output a pop-up window indicating that it is possible to install the plug-in app related to the registered payment means. According to an embodiment, when the user of the electronic device selects a relevant icon or button within the pop-up window, the electronic device may display a detailed screen of the corresponding plug-in app. In this case, the user may install the plug-in app by using the installation menu of the detailed screen as described in FIG. 8C. In another example, when the pop-up window is selected, the electronic device may display a plug-in app list screen. In this case, the user of the electronic device may install the plug-in app by using the installation menu of the list screen as described in FIG. 8B.

According to an embodiment, when a point card or a membership card is registered, the electronic device may induce installation of a plug-in app related to the corresponding card in a similar method to that of FIG. 9A.

Figure 9B:
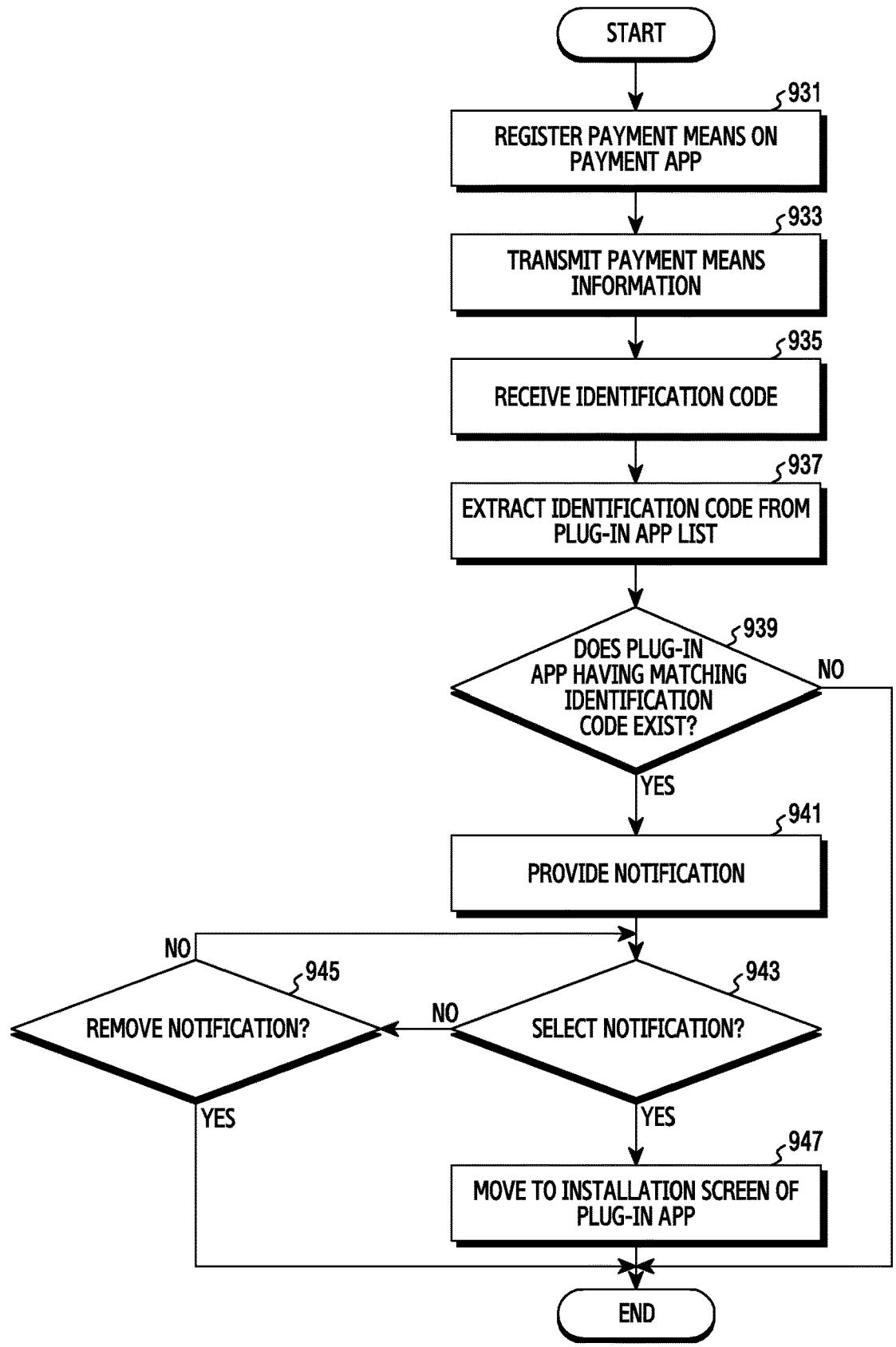
FIG. 9B is a flowchart showing a method for installing a plug-in app by using registration of a payment means according to an embodiment of the present disclosure.
Figure 9C:
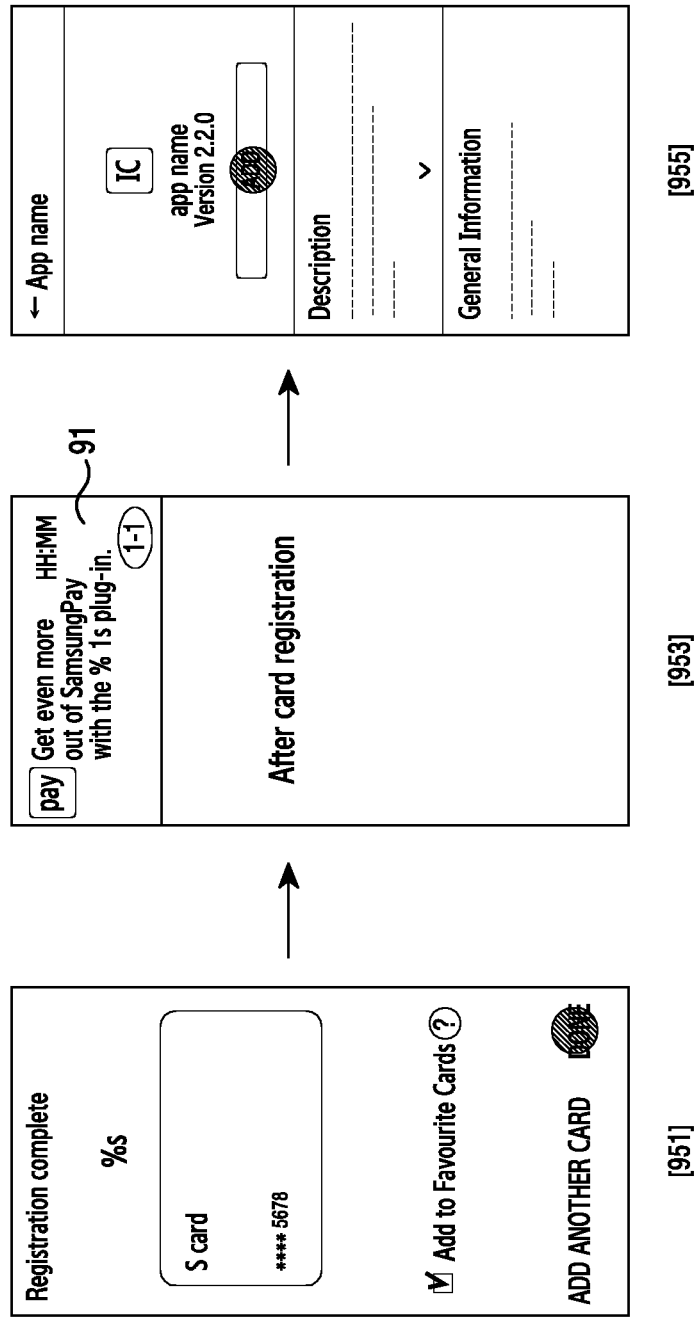
FIG. 9C is a view showing an example of a screen to explain a method for installing a plug-in app by using registration of a payment means according to an embodiment of the present disclosure.

FIG. 9B is a flowchart showing a method for installing a plug-in app by using registration of a payment means according to an embodiment of the present disclosure, and FIG. 9C is a view showing an example of a screen to explain a method for installing a plug-in app by using registration of a payment means according to an embodiment of the present disclosure.

Referring to FIGS. 9B and 9C, in operation 931, a processor (for example, the processor 120 of FIG. 1, the processor 210 of FIG. 2, the processor 601 of FIG. 6) of an electronic device (for example, the electronic device 101 of FIG. 1, the electronic device 201 of FIG. 2, the electronic device 405 of FIGS. 4 and 5, the electronic device 600 of FIG. 6) according to various embodiments of the present disclosure may detect registration of a payment means (such as, for example, a credit card, a debit card, or a bank account) on a payment app. For example, the processor may register the payment means (that is, for example, may store information on the payment means) by receiving an input (a first user input) of information related to the payment means (for example, a card number, an expiration date, a password, an account number, a user name, or a resident registration number, etc.) from a user through a payment means registration screen of the payment app. According to an embodiment, the processor may automatically recognize at least a portion of the information of the payment means through a card image photographed by a camera, and may register the payment means by receiving an input of a portion of information through the registration screen.

According to an embodiment of the present disclosure, in operation 933, the processor may transmit the information regarding the registered payment means to a payment server (such as, for example, the payment server 403 of FIGS. 4 and 5). According to an embodiment of the present disclosure, in operation 935, the processor may receive an identification code regarding the registered payment means from the payment server. According to an embodiment, the processor may also receive an identification code of another third party related to the identification code. According to an embodiment, the processor may request an identification code from a server of the third party and may receive the identification code. For example, when it is possible to recognize an issuer (or third party) by using a BIN code of a credit card, the processor may receive an identification code of a server of the corresponding third party and/or an identification code of another third party related to the identification code.

According to an embodiment of the present disclosure, in operation 937, the processor may extract identification codes of plug-in apps included in a plug-in app list.

According to an embodiment of the present disclosure, in operation 939, the processor may compare the received identification code and the extracted identification codes, and identify whether there is a plug-in app having a matching identification code in the list.

In operation 939, when there is no plug-in app having a matching identification code, the processor may finish the operation of installing the plug-in app by using the registration of the payment means.

As a result of identifying in operation 939, when there is a plug-in app having a matching identification code, the processor may generate a notification (for example, a user interface for installing the plug-in app) for initiating installation of the plug-in app related to the registered payment means in operation 941. For example, when registration of a card is completed on a card registration screen as shown in view 951 of FIG. 9C, the processor may output a pop-up window 91 informing that there is a plug-in app related to the registered card on an upper end of a screen as shown in view 953. According to an embodiment, the processor may provide the notification by display on a notification bar or a notification panel.

According to an embodiment of the present disclosure, in operation 943, the processor may identify whether the notification is selected. When the notification is not selected, the processor may identify whether a request for removal of the notification is detected in operation 945.

As a result of identifying in operation 945, when there is no request for removal of the notification, the processor may return to operation 943. On the other hand, when there is a request for removal of the notification, the processor may finish the operation of installing the plug-in app by using registration of the payment means.

As a result of identifying in operation 943, when the notification is selected, the processor may control a display to display a screen through which the corresponding plug-in app is installed in operation 947. For example, the display may display a detailed screen of the corresponding plug-in app as shown in view 955 of FIG. 9C. The user may install the plug-in app through an installation menu (ADD) of the detailed screen, or may not install the plug-in app and may finish the operation of installing the plug-in app through registration of the payment means.

According to an embodiment, the payment server may request information of an installable plug-in app associated with the payment means from the server of the third party by using the information of the registered payment means (card or account), and may receive the information, and may transmit the information of the installable plug-in app to the electronic device (for example, a payment app).

According to an embodiment, when the electronic device (for example, the payment app) receives an identification code from the payment server, the electronic device may request information of an installable plug-in app from a server of a third party corresponding to the received identification code, and may receive the information. An address of the server of the third party may be requested from the payment server and received, or a list of addresses of servers of third parties may be received from the payment server and stored.

According to an embodiment, the electronic device (for example, the payment app) may provide a list of the received at least one installable plug-in app, and may install at least one plug-in app according to user's selection and may aggregate (or integrate) the plug-in app with the payment app.

Figure 10A:
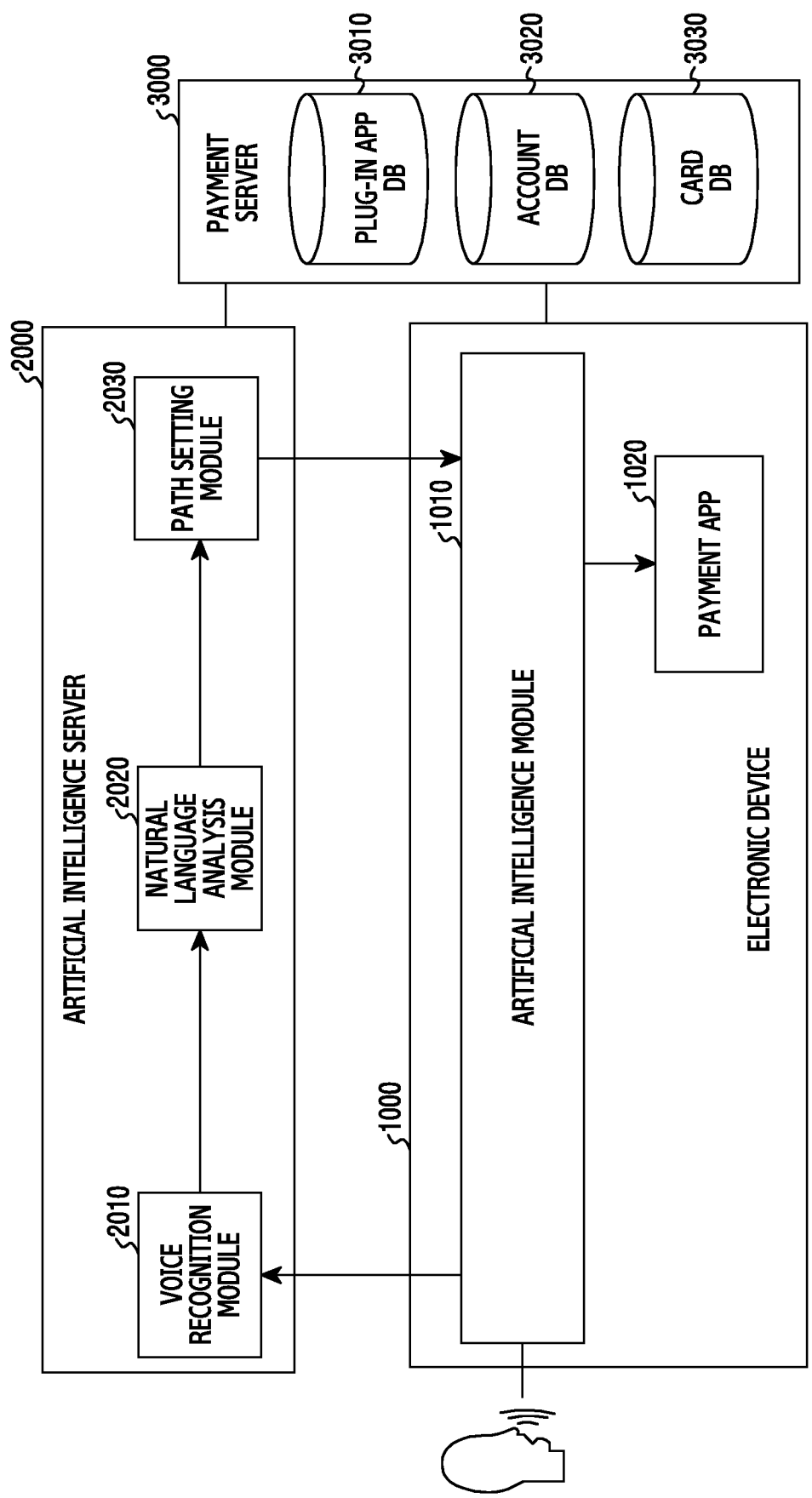
FIG. 10A is a view to explain a method for installing a plug-in app by executing a function according to an embodiment of the present disclosure.

FIG. 10A is a view to explain a method for installing a plug-in app by executing a function according to an embodiment of the present disclosure.

Referring to FIG. 10A, an electronic device 1000 (for example, the electronic device 101 of FIG. 1, the electronic device 201 of FIG. 2, the electronic device 405 of FIGS. 4 and 5, the electronic device 600 of FIG. 6) according to various embodiments of the present disclosure may notify of installation of a corresponding plug-in app when execution of a function that is not installed in a payment app is requested.

According to an embodiment of the present disclosure, an artificial intelligence module 1010 of the electronic device 1000 may transmit a sample of a user's voice received through a microphone (not shown) to an artificial intelligence server 2000.

According to an embodiment of the present disclosure, the artificial intelligence server 2000 may convert the user voice into a text format through a voice recognition module 2010. The artificial intelligence server 2000 may analyze the text through a natural language analysis module 2020, and may extract one or more keywords from the text and retrieve corresponding "intentions" associated with the one or more keywords. Further methods for extracting an "intention" and a keyword through the natural language analysis may use various well-known technologies so additional description is omitted here.

According to an embodiment of the present disclosure, the artificial intelligence server 2000 may set a path for executing a function according to the user's intention through a path setting module 2030, and may transmit the set path to the electronic device 1000. For example, when the user inputs "Please remit  won to B," the path setting module 2030 may set a path for executing the function, based on a plug-in app database (DB) 3010, an account database 3020, and/or a card database 3030 of a payment server 3000. For example, the path may be set to "Executing a payment app"→"Executing a remittance menu of a plug-in app added to the payment app"→"Entering an amount of  won in a remittance input field of a remittance screen of the plug-in app."

According to an embodiment of the present disclosure, the artificial intelligence module 1010 of the electronic device 1000 may request a payment app 1020 to execute a specific function according to the received path. According to an embodiment of the present disclosure, the payment app 1020 may identify whether the requested function is executable. For example, the payment app 1020 may identify whether a plug-in app for the remittance function is installed or not. When the plug-in app is not installed, the payment app 1020 of the electronic device 1000 may provide a notification for inducing installation of the plug-in app (for example, a pop-up window asking whether to install the plug-in app). When the installation of the plug-in app is approved, the payment app 1020 may install the plug-in app.

According to an embodiment of the present disclosure, when the installation of the plug-in app is completed, the payment app 1020 may execute the function in sequence according to the set path and then display the remittance screen.

According to an embodiment, the artificial intelligence module 1010 may transmit a text input by the user to the artificial intelligence server 2000, and may receive a path for executing a function according to a user's intention from the artificial intelligence server 2000.

According to an embodiment, the artificial intelligence module 1010 may be divided according to functions. For example, the artificial intelligence module 1010 may include a voice reception module or a function execution module.

According to an embodiment, the operations of analyzing a user's voice and/or text and setting a path, performed at the artificial intelligence server 2000, may be performed at the electronic device 1000.

According to an embodiment, the electronic device 1000 may provide a notification for inducing installation of a plug-in app when execution of a function that is not installed in is requested through a menu of the payment app.

Figure 10B:
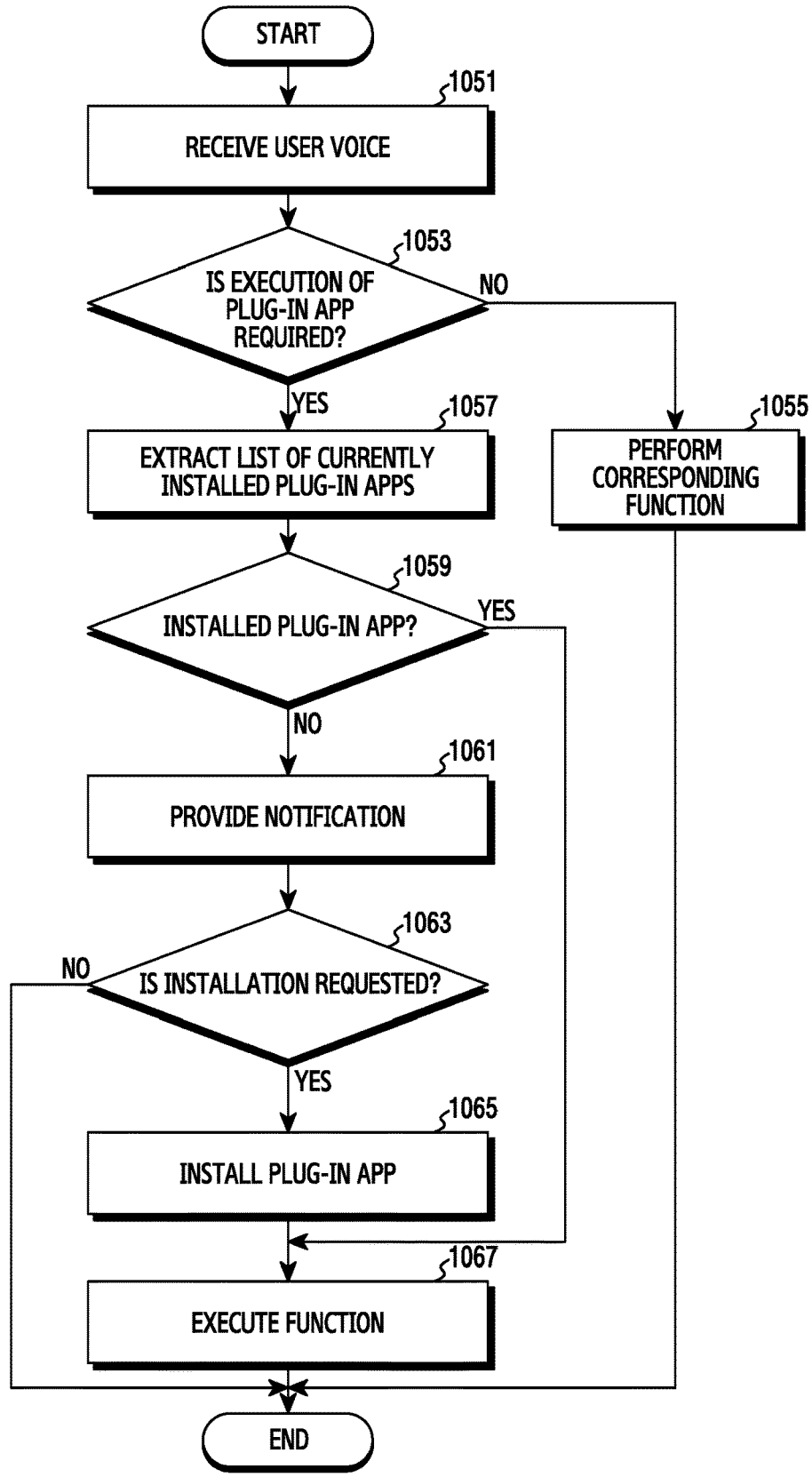
FIG. 10B is a flowchart to explain a method for installing a plug-in app by executing a function according to an embodiment of the present disclosure.
Figure 10C:
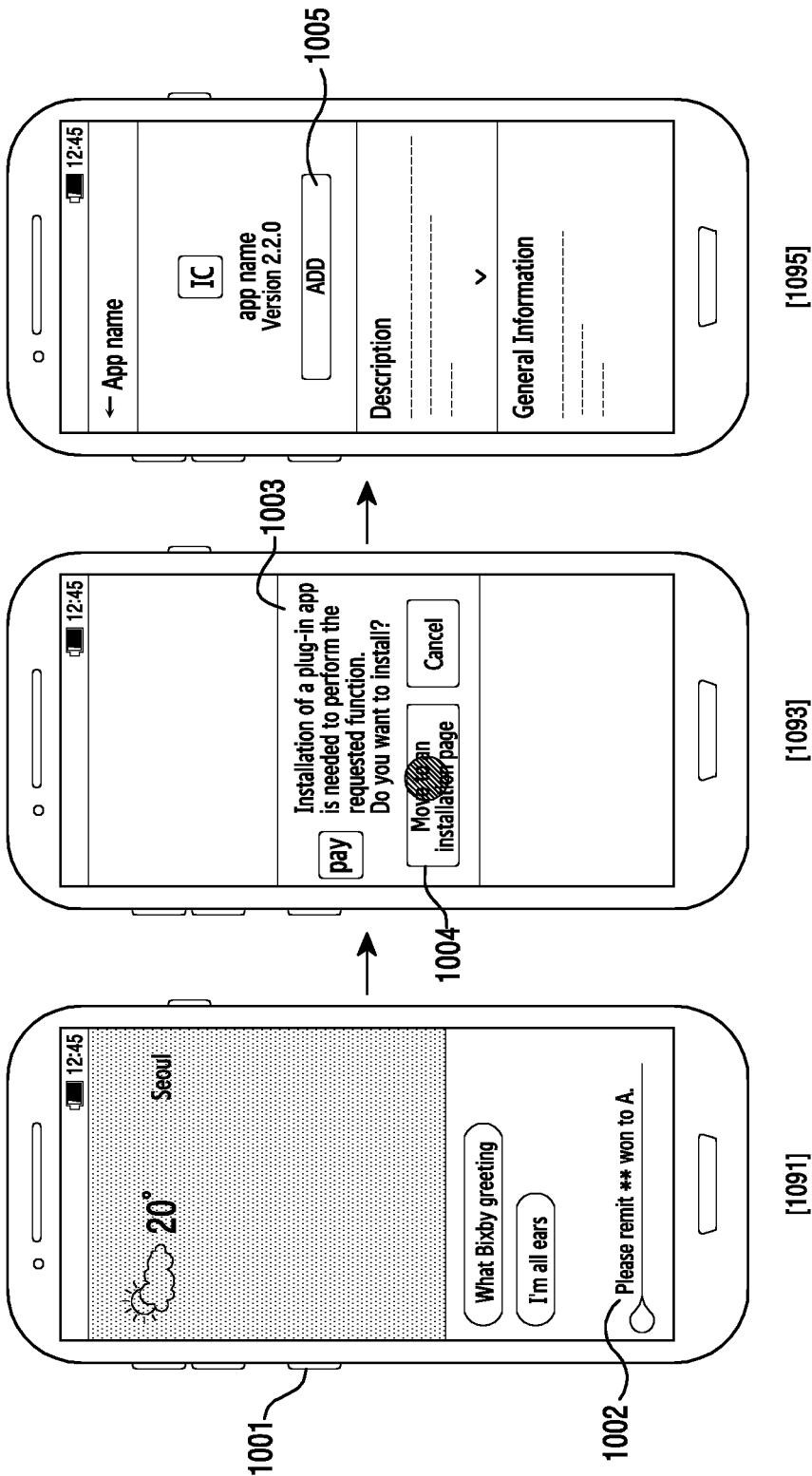
FIG. 10C is a view showing an example of a screen to explain a method for installing a plug-in app by executing a function according to an embodiment of the present disclosure.

FIG. 10B is a flowchart to explain a method for installing a plug-in app by executing a function according to an embodiment of the present disclosure, and FIG. 10C is a view showing an example of a screen to explain a method for installing a plug-in app by executing a function according to an embodiment of the present disclosure.

Referring to FIGS. 10B and 10C, in operation 1051, a processor (for example, the processor 120 of FIG. 1, the processor 210 of FIG. 2, the processor 610 of FIG. 6) of an electronic device (for example, the electronic device 101 of FIG. 1, the electronic device 201 of FIG. 2, the electronic device 405 of FIGS. 4 and 5, the electronic device 600 of FIG. 6, the electronic device 1000 of FIG. 10A) according to various embodiments of the present disclosure may receive a user voice (e.g., a user's voice command for initiating a payment). For example, when an input (such as, for example, a pressing of a predetermined physical button (e.g., an artificial intelligence service key 1001, as shown in view 1091 of FIG. 10C)) is detected, the processor may activate a microphone and receive an input of a user voice (for example, "Please remit  won to A."). In this case, the processor may convert the input voice into a text, and may display the converted text 1002 on a region of the screen. According to an embodiment, the processor may receive an input of a text through an input device (for example, a virtual keypad of a touch screen). According to an embodiment, the converted text 1002** may be modified through the input device.

According to various embodiments of the present disclosure, in operation 1053, the processor may identify whether the inputted voice utilizes execution of a plug-in app related to a payment app. For example, the processor may transmit the voice to an artificial intelligence server (for example, the artificial intelligence server 2000 of FIG. 10A), and receive a path for executing the function corresponding to the voice from the artificial intelligence server, and may identify whether the path includes a plug-in app.

According to an embodiment, at least portion of setting the path through the voice analysis may be performed by the processor of the electronic device.

As a result of identifying in operation 1053, when the execution of the plug-in app is not utilized, the processor may proceed to operation 1055 to perform a corresponding function. For example, when there is a request for taking a photo, the processor may execute a camera application.

As a result of identifying in operation 1053, when the execution of the plug-in app is utilized, the processor may extract a list of currently installed plug-in apps in operation 1057.

According to various embodiments of the present disclosure, in operation 1059, the processor may identify whether the plug-in app that was requested to be executed is a presently installed plug-in app. For example, the processor may identify whether the plug-in app requested to be executed is included in the list of the installed plug-in apps.

As a result of identifying in operation 1059, when the plug-in app requested to be executed is the installed plug-in app, the processor may execute the requested function in operation 1067. On the other hand, as a result of identifying in operation 1059, when the plug-in app requested to be executed is not the installed plug-in app, the processor may generate a notification prompting a user to induce or initiate installation of the plug-in app which was requested in operation 1061. For example, as shown in view 1093 of FIG. 10C, the processor may output a pop-up window 1003 prompting confirmation of whether to install the plug-in app that was requested on a region of the screen. According to an embodiment, the processor may provide the notification by using a notification bar or a notification panel.

According to an embodiment of the present disclosure, in operation 1063, the processor may identify whether the installation is requested. When the installation is not requested as a result of identifying in operation 1063, the processor may finish the operation of installing the plug-in app to perform the function. On the other hand, when the installation is requested as a result of identifying in operation 1063, the processor may install the plug-in app requested to be executed in operation 1065. For example, when "Move to an installation page" 1004 is selected in view 1093 of FIG. 10C, the processor may display a plug-in app installation screen as shown in view 1095. When an installation menu 1005 is selected on the installation screen as shown in view 1095, the processor may download a setup file from an app server (for example, the app server 406 of FIGS. 4 and 5) and may install the plug-in app. The installation screen is merely an example and does not limit various embodiments of the present disclosure.

When the installation of the plug-in app requested to be executed is completed, the processor according to various embodiments of the present disclosure may execute the requested function in operation 1067. For example, the processor may output a remittance screen for remitting. According to an embodiment, when the installation of the plug-in app is completed, the processor may perform authentication, and may perform operation 1067 when authentication succeeds. According to another embodiment, when the installation of the plug-in app is requested, the processor may perform authentication, and may operation 1065 when authentication succeeds.

Figure 11:
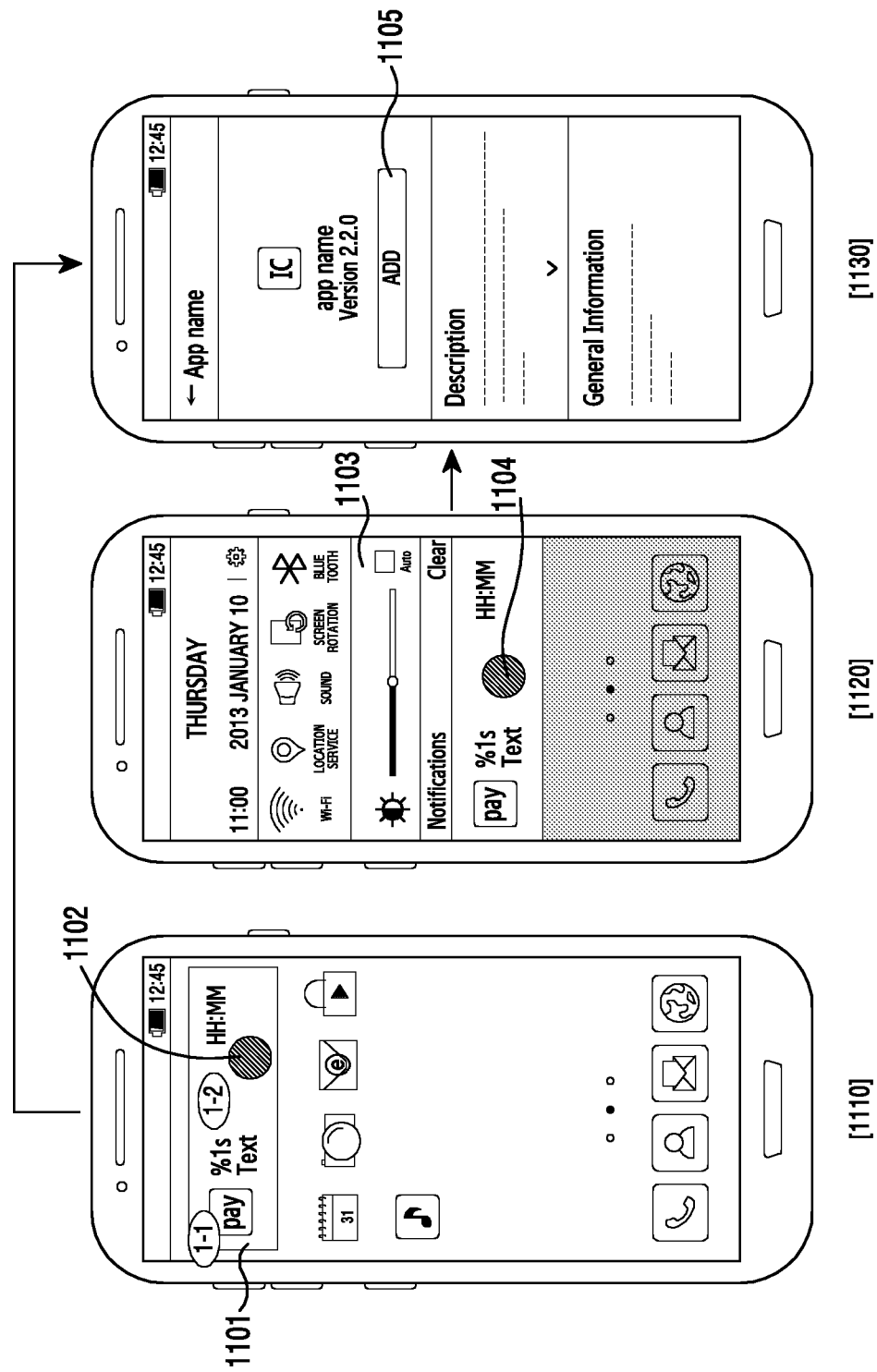
FIG. 11 is a view showing an example of a screen to explain a method for installing a plug-in app by using a push message according to an embodiment of the present disclosure.

FIG. 11 is a view showing an example of a screen to explain a method for installing a plug-in app by using a push message according to an embodiment of the present disclosure.

Referring to FIG. 11, an electronic device (for example, the electronic device 101 of FIG. 1, the electronic device 201 of FIG. 2, the electronic device 405 of FIGS. 4 and 5, the electronic device 600 of FIG. 6, the electronic device 1000 of FIG. 10A) according to an embodiment of the present disclosure may receive a push message 1101 informing that a plug-in app related to a payment app is added or there is an update, as shown in view 1110. The push message may be generated by a payment server (for example, the payment server 403 of FIGS. 4 and 5).

According to an embodiment, when display of a notification panel is requested in the state shown in view 1110 (for example, by touching an upper end of the display and then dragging downward), the electronic device may display the notification panel 1103 as shown in view 1120. When the push message is selected on the notification panel 1103 (1104), the electronic device may display an installation screen through which a plug-in app corresponding to the push message is installed. For example, the electronic device may output a detailed screen of the plug-in app corresponding to the push message as shown in view 1130. The user of the electronic device may install the plug-in app through selection of an installation menu 1105 on the detailed screen.

According to an embodiment, when the push message is selected in the state shown in view 1110 (1102), the electronic device may display the installation screen through which the plug-in app corresponding to the push message is installed. For example, the electronic device may output the detailed screen of the plug-in app corresponding to the push message as shown in view 1130. The user of the electronic device may install the plug-in app through the installation menu 1105 on the detailed screen.

Figure 12:
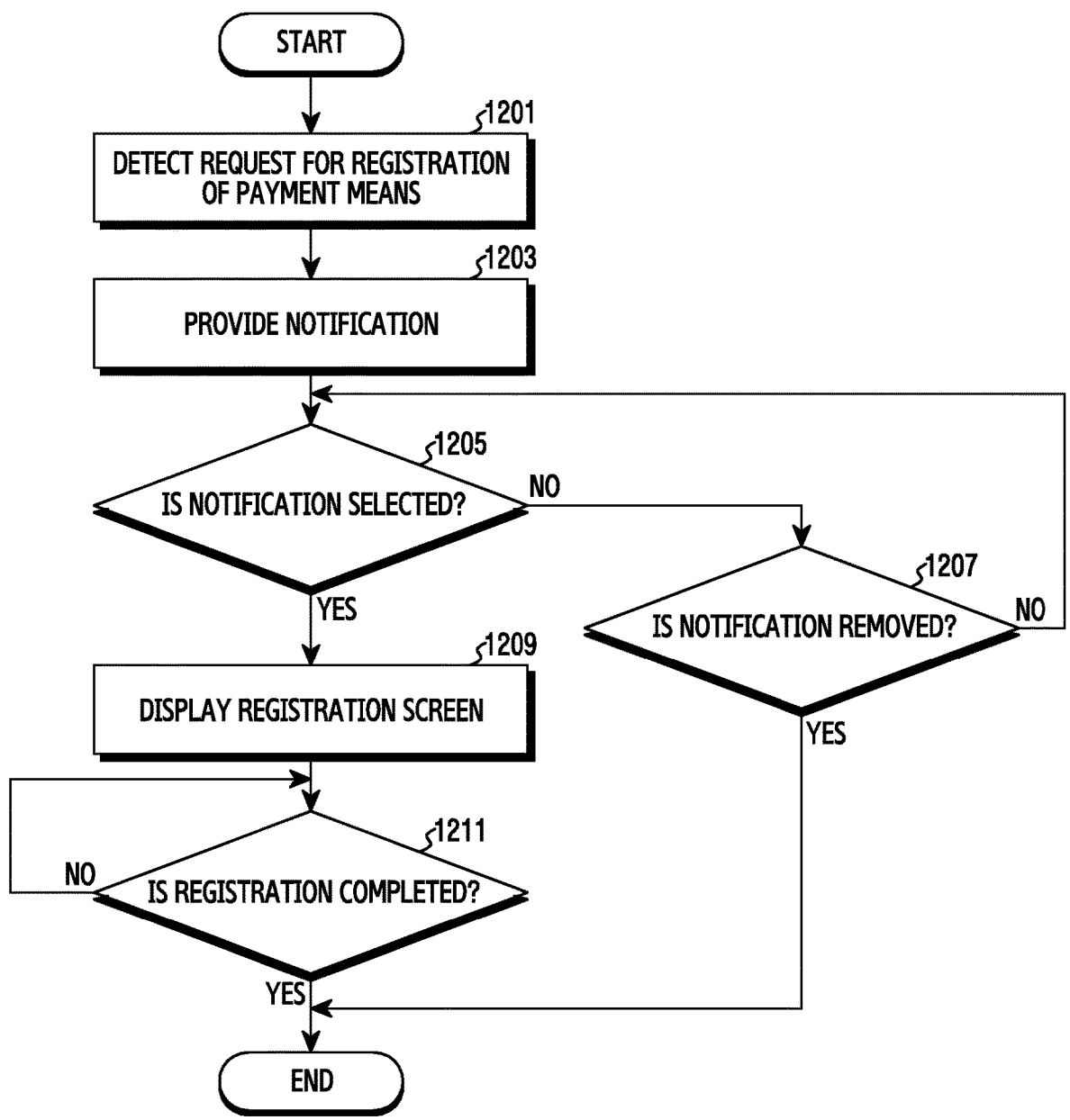
FIG. 12 is a flowchart to explain a method for registering a card by using a push message according to an embodiment of the present disclosure.
Figure 13:
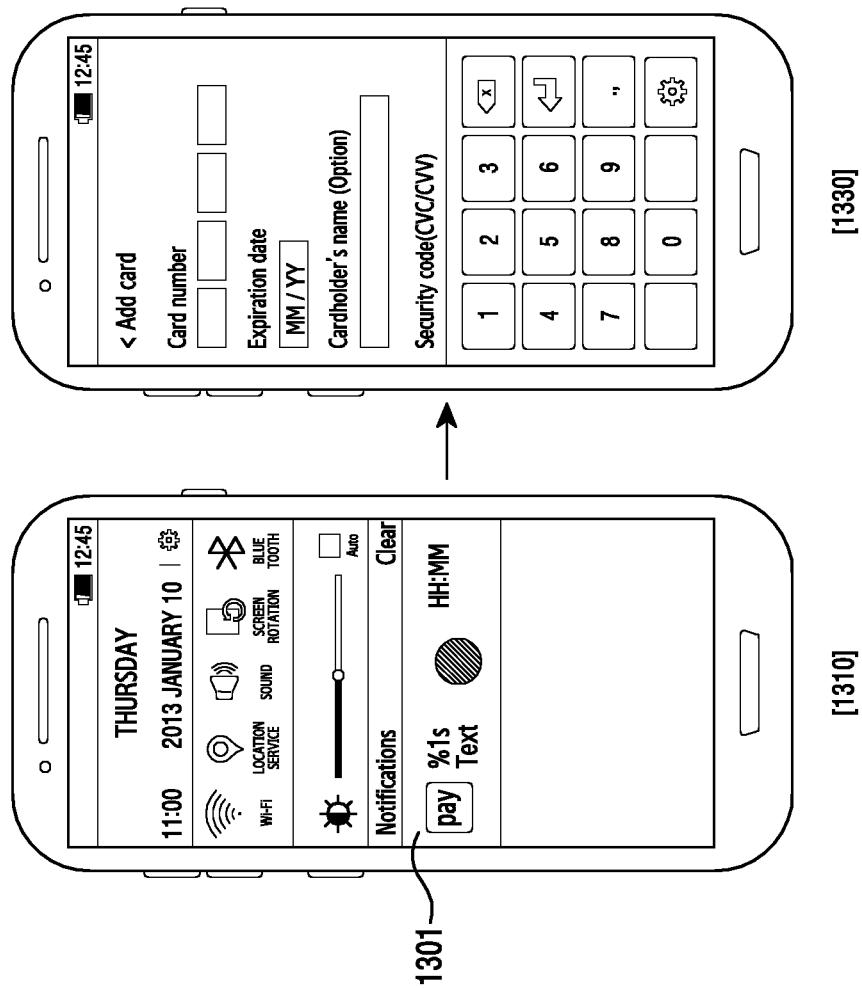
FIG. 13 is a view showing an example of a screen to explain a method for registering a card by using a push message according to an embodiment of the present disclosure.

FIG. 12 is a flowchart to explain a method for registering a card by using a push message according to an embodiment of the present disclosure, and FIG. 13 is a view showing an example of a screen to explain a method for registering a card by using a push message according to an embodiment of the present disclosure.

Referring to FIGS. 12 and 13, in operation 1201, a processor (for example, the processor 120 of FIG. 1, the processor 210 of FIG. 2, the processor 610 of FIG. 6) of an electronic device (for example, the electronic device 101 of FIG. 1, the electronic device 201 of FIG. 2, the electronic device 405 of FIGS. 4 and 5, the electronic device 600 of FIG. 6, the electronic device 1000 of FIG. 10A) according to an embodiment of the present disclosure may detect a request for registration of a payment means. The request for the registration of the payment means may be detected when a plug-in app is installed in the payment app, but a payment means (card or account) is not registered on the installed plug-in app, or when a payment means related to the installed plug-in app is not registered on the payment app. The request for the registration may be detected by the plug-in app.

According to an embodiment, when the registration of the payment means is requested, the processor may provide a notification in operation 1203. For example, the plug-in app detecting the request for the registration may request the payment app to provide a notification requesting the registration of the payment means. When receiving the request for the notification, the payment app may provide the notification in various methods (for example, a pop-up window, a notification bar, a notification panel, a push message, or the like). For example, the payment app may provide the notification by using a notification panel 1301 as shown in view 1310 of FIG. 13.

According to various embodiments of the present disclosure, the processor may identify whether the notification is selected (for example, touched) in operation 1205.

When the notification is not selected as a result of identifying in operation 1205, the processor may identify whether the notification is removed in operation 1207. When the notification is not removed as a result of identifying in operation 1207, the processor may return to operation 1205. On the other hand, when the notification is removed as a result of identifying in operation 1207, the processor may finish the operation of registering the payment means.

When the notification is selected as a result of identifying in operation 1205, in operation 1209, the processor may display a registration screen through which a payment means is registered. For example, as shown in view 1330, the processor may control the display to display the registration screen for registering a card. For example, the registration screen may be a payment means registration screen of the plug-in app or a payment means registration screen of the payment app.

According to various embodiments of the present disclosure, in operation 1211, the processor may identify whether the registration is completed. When the registration is not completed as a result of identifying in operation 1211, the processor may maintain operation 1211. When the registration is completed as a result of identifying in operation 1211, the processor may finish the operation of registering the payment means.

According to an embodiment, operations 1203 to 1207 may be omitted. For example, the plug-in app may request the payment app to register the payment means when detecting a request for registration of the payment means. Upon receiving the request for the registration, the payment app may directly output the registration screen for registering the payment means. For example, the payment app may directly output the registration screen as shown in view 1330 without providing the notification as shown in view 1310 of FIG. 13.

Figure 14:
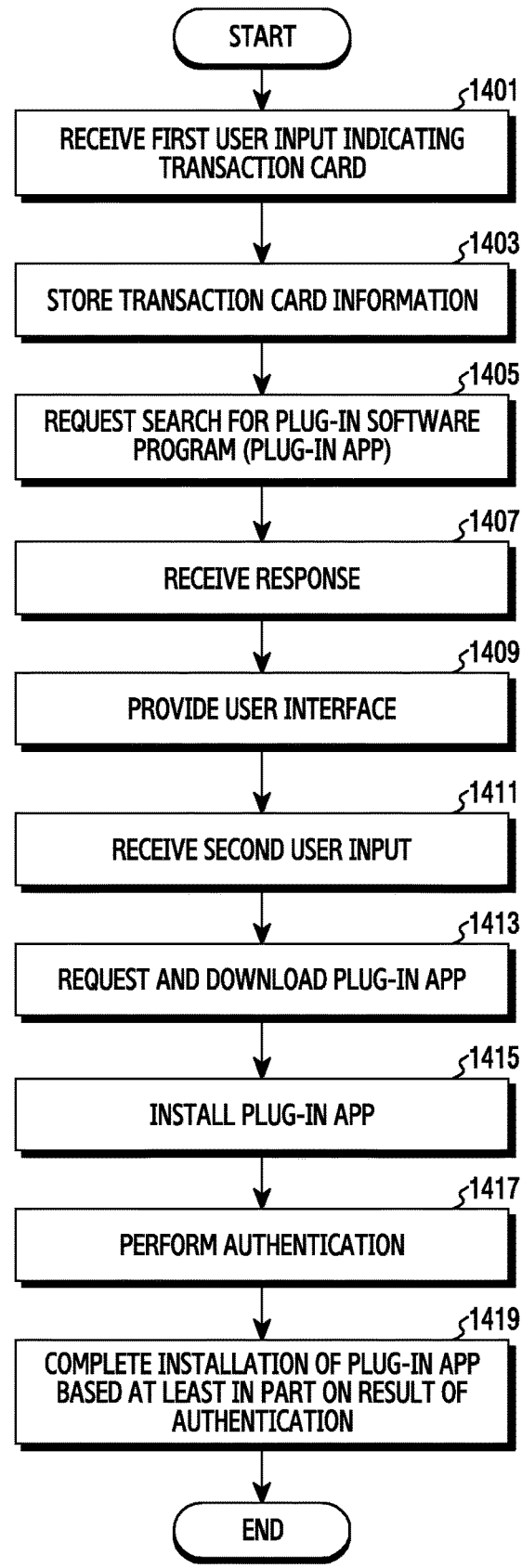
FIG. 14 is a flowchart showing a method for installing a plug-in app according to an embodiment of the present disclosure.

FIG. 14 is a flowchart showing a method for installing a plug-in app according to an embodiment of the present disclosure.

Referring to FIG. 14, in operation 1401, a processor (for example, the processor 120 of FIG. 1, the processor 210 of FIG. 2, the processor 610 of FIG. 6) of an electronic device (for example, the electronic device 101 of FIG. 1, the electronic device 201 of FIG. 2, the electronic device 405 of FIGS. 4 and 5, the electronic device 600 of FIG. 6, the electronic device 1000 of FIG. 10A) according to various embodiments of the present disclosure may receive a first user input indicating a transaction card. The transaction card may be associated with an issuer ID (for example, an identification code). For example, the processor may receive an input of information related to the transaction card (for example, a card number, an expiration date, a password, an account number, a user name, a resident registration number, etc.) through a payment means registration screen of a first application program (for example, a payment app) displayed on a display (for example, the display 160 of FIG. 1, the display 260 of FIG. 2, the touch screen display 630 of FIG. 6). According to an embodiment, the processor may automatically recognize at least a portion of the information through a card image photographed through a camera, and may receive an input of the other portion of the information through the registration screen.

According to an embodiment of the present disclosure, in operation 1403, the processor may store the card information associated with the first application.

According to an embodiment of the present disclosure, in operation 1405, the processor may request a search for a plug-in software program (hereinafter, a plug-in app). For example, the processor may transmit a request for the search for the plug-in app associated with the issuer ID to a first external server (for example, the payment server 403 of FIGS. 4 and 5) through a communication circuit (for example, the communication interface 170 of FIG. 1, the communication module 220 of FIG. 2, the communication circuit 640 of FIG. 6).

According to an embodiment of the present disclosure, in operation 1407, the processor may receive a response. For example, the processor may receive, from the first external server through the communication circuit, a response including information regarding at least one plug-in app (for example, a plug-in app list) retrieved as a result of the executed search.

According to an embodiment of the present disclosure, in operation 1409, the processor may provide a user interface. For example, the processor may provide a user interface for allowing a user to configure or authorize installation of the at least one plug-in app on the display.

According to an embodiment of the present disclosure, in operation 1411, the processor may receive a second user input. For example, the processor may receive the second user input through the user interface for confirming the intention to install the at least one plug-in app.

According to an embodiment of the present disclosure, in operation 1413, the processor may request and download the plug-in app. For example, the processor may transmit an access request of the at least one plug-in app to a second external server (for example, the app server 406 of FIGS. 4 and 5) through the communication circuit, and may download the at least one plug-in app from the second external server through the communication circuit.

According to an embodiment of the present disclosure, in operation 1415, the processor may install the plug-in app. For example, the processor may install the downloaded at least one plug-in app as a portion of the first application program.

According to an embodiment of the present disclosure, in operation 1417, the processor may perform authentication. For example, the processor may request an authentication server (such as, for example, the authentication server 404 of FIGS. 4 and 5) to authenticate the installed at least one plug-in app. The method for authenticating has been described above and a repetition of the description is omitted here for the sake of brevity.

According to an embodiment of the present disclosure, in operation 1419, the processor may complete the installation of the plug-in app based at least in part on the result of authentication. For example, when the authentication succeeds, the processor may aggregate (or integrate) the plug-in app and the first application program with each other. On the other hand, when the authentication fails, the processor may uninstall the plug-in app.

According to various embodiments of the present disclosure, a method for providing a plug-in app of an electronic device (e.g., the electronic device 101 of FIG. 1, the electronic device 201 of FIG. 2, the electronic device 405 of FIGS. 4 and 5, the electronic device 600 of FIG. 6, or the electronic device 1000 of FIG. 10A) which comprises an application program for performing a payment may comprise receiving a first user input indicating a transaction card associated with an issuer ID (identification); storing information regarding the transaction card associated with the application program; transmitting, to a first external server (e.g., the payment server 403 of FIGS. 4 and 5), a request for a search for a plug-in software program associated with the issuer ID; receiving, from the first external server, a response comprising information regarding at least one searched plug-in software program; providing a user interface for installing the at least one plug-in software program on a display (e.g., the display 160 of FIG. 1, the display 260 of FIG. 2, or the touch screen display 630 of FIG. 6); receiving a second user input through the user interface for installing the at least one plug-in software program; transmitting an access request of the at least one plug-in software program to a second external server (e.g., the app server 406 of FIGS. 4 and 5) through a communication circuit (e.g., the communication interface 170 of FIG. 1, the communication module 220 of FIG. 2, or the communication circuit 640 of FIG. 6); downloading the at least one plug-in software program from the second external server through the communication circuit; installing the at least one plug-in software program as a portion of the application program; performing authentication regarding the installed at least one plug-in software program; and based at least in part on a result of the authentication, completing the installation of the at least one plug-in software program.

According to various embodiments, the method may further comprise detecting a request for a function execution through a menu of the application program or a voice input; identifying whether the requested function utilizes installation of a plug-in software program related to the application program; and when the installation is utilized, providing a user interface for identifying whether to install.

According to various embodiments, the method may further comprise installing the plug-in software program which is requested to be installed, and then executing the requested function.

According to various embodiments, the performing the authentication may comprise extracting at least one of a signature, a version, or a service ID of the installed plug-in software program; transmitting the extracted at least one of the signature, the version, or the service ID to a third external server; and receiving a result of the authentication from the third external server.

According to various embodiments, the method may further comprise when the authentication fails uninstalling the installed at least one plug-in software program.

According to various embodiments, the method may further comprise adding at least one icon corresponding to the installed at least one plug-in software program to a home screen of the application program.

According to various embodiments, the method may further comprise receiving, from the first external server, a push message comprising information regarding at least one new plug-in software program related to the application program, or update information regarding the installed at least one plug-in software program; and when the push message is selected, providing a user interface for installing the at least one new plug-in software program or for updating the installed at least one plug-in software program on the display.

According to various embodiments, the method may further comprise receiving a request for registration of a payment means related to the installed at least one plug-in software program; and when receiving the request for the registration, providing a user interface informing a user of necessity of registering the payment means.

According to various embodiments, the method may further comprise receiving a request for registration of a payment means related to the installed at least one plug-in software program; and providing a user interface for registering the payment means in response to the request for the registration being received.

According to various embodiments, the method may further comprise registering the payment means at least one of the installed at least one plug-in software program or the application program.

Various embodiments of the present disclosure may safely use services of various third parties through a payment service. Various embodiments of the present disclosure may notify of installation of a plug-in service or registration of a payment means.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 232 or external memory 234) that is readable by a machine (e.g., the electronic device 101, 201, 405, 600). For example, a processor (e.g., the processor 120, 210, 610) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments disclosed herein are provided merely to easily describe technical details of the present disclosure and to help the understanding of the present disclosure, and are not intended to limit the present disclosure. Accordingly, the present disclosure should be construed as including all modifications or various other embodiments based on the technical idea of the present disclosure.

In addition, embodiments disclosed in the present specification are presented for easy explanation and understanding of the technical features, and are not intended to limit the present disclosure. Therefore, the present disclosure should be interpreted as including all changes or various other embodiments based on the technical idea of the present disclosure.

What is claimed is:

1. An electronic device comprising:
a housing;
a touch screen display exposed through a portion of the housing;
a communication circuit disposed at least partially within the housing;
a processor disposed inside the housing and operatively connected with the display and the communication circuit; and
a memory disposed inside the housing and operatively connected with the processor,
wherein the memory stores instructions executable to cause the processor to:
receive a first user input indicating information for a transaction card through an application program for executing a payment through the electronic device;
store the indicated information for the transaction card in association with the application program;
in response to storing the indicated information for the transaction card:
identify an issuer identification of an issuer issuing the transaction card based on the information for the transaction card,
transmit, to a first external server through the communication circuit, the issuer identification to search at least one plug-in software program associated with the issuer identification,
receive, from the first external server through the communication circuit, a response indicating the searched at least one plug-in software program; and
display a user interface for installing at least one of the searched at least one plug-in software program on the display;
receive a second user input to the user interface requesting installation of a first plug-in software program of the searched at least one plug-in software program;

transmit an access request requesting download of the first plug-in software program to a second external server through the communication circuit;

download the first plug-in software program from the second external server through the communication circuit;

temporarily install the first plug-in software program;

extract authentication information for authenticating whether to complete an installation of the temporarily installed first plug-in software program from the temporarily installed first plug-in software program;

transmit the extracted authentication information to an authentication server through the communication circuit;

receive a result of authentication from the authentication server based on the transmitted authentication information;

in response to the result of the authentication being a success, complete the installation of the temporarily installed first plug-in software program by integrating the completely installed first plug-in software program within the application program for executing the payment; and in response to the result of the authentication being a failure, uninstall the temporarily installed first plug-in software program.

2. The electronic device of claim 1, wherein the instructions cause the processor to:

detect a request to execute a function by a particular input to a displayed menu of the application program or by reception of a voice input;

identify whether the requested function requires installation of a particular plug-in software program related to the application program; and when the installation is required, display a user interface prompting confirmation to initiate installation of the particular plug-in software program.

3. The electronic device of claim 2, wherein the instructions cause the processor to install the particular plug-in software program in response that an installation of the particular plug-in software program is requested via the user interface, and execute the requested function.

4. The electronic device of claim 1, wherein the authentication information comprises at least one of a signature, a version, or a service ID of the temporarily installed first plug-in software program.

5. The electronic device of claim 1, wherein the instructions cause the processor to add at least one icon corresponding to the completely installed first plug-in software program to a home screen of the application program.

6. The electronic device of claim 1, wherein the instructions cause the processor to:

receive, from the first external server, a push message including at least one of information regarding at least one new plug-in software program related to the application program, and update information regarding the completely installed first plug-in software program; and when the push message is selected, display a user interface for at least one of installing the at least one new plug-in software program and updating the completely installed first plug-in software program on the display.

7. The electronic device of claim 1, wherein the instructions cause the processor to:

receive a request to install a plug-in software program related to at least one payment means registered at the application program; and when receiving the request for the installation, display a user interface for inducing the installation of the plug-in software program.

8. The electronic device of claim 1, wherein the instructions cause the processor to:

receive a request for registration of a payment means related to the completely installed first plug-in software program; and display a user interface for registering the payment means in response to the request for the registration being received.

9. The electronic device of claim 8, wherein the instructions cause the processor to register the payment means to at least one of the completely installed first plug-in software program or the application program.

10. The electronic device of claim 1, wherein the processor is configured to extract application information identifying the temporarily installed first plug-in software program from the temporarily installed first plug-in software program as the authentication information.

11. A method in an electronic device, the method comprising:

receiving a first user input indicating a transaction card through an application program for executing a payment through the electronic device;

storing information for the transaction card in association with the application program;

in response to storing the indicated information for the transaction card:

identifying an issuer identification of an issuer issuing the transaction card based on the information for the transaction card;

transmitting, to a first external server, the issuer identification to search at least one plug-in software program associated with the issuer identification, receiving, from the first external server, a response indicating the searched at least one searched plug-in software program; and displaying a user interface for installing at least one of the searched at least one plug-in software program on a display;

receiving a second user input to the user interface requesting installation of a first plug-in software program of the searched at least one plug-in software program;

transmitting an access request requesting download of the first plug-in software program to a second external server through a communication circuit;

downloading the first plug-in software program from the second external server through the communication circuit;

temporarily installing the first plug-in software program;

extracting authentication information for authenticating whether to complete an installation of the temporarily installed first plug-in software program from the temporarily installed first plug-in software program;

transmitting the extracted authentication information to an authentication server through the communication circuit;

receiving a result of authentication from the authentication server based on the transmitted authentication information;

in response to the result of the authentication being a success, completing the installation of the temporarily installed first plug-in software program by integrating the completely installed first plug-in software program within the application program for executing the payment; and in response to the result of the authentication being a failure, uninstalling the temporarily installed first plug-in software program.

12. The method of claim 11, further comprising:
detecting a request to execute a function by a particular input to a displayed menu of the application program or by reception of a voice input;
identifying whether the requested function requires installation of a particular plug-in software program related to the application program; and
when the installation is required, displaying a user interface prompting confirmation to initiate installation of the particular plug-in software program.

13. The method of claim 12, further comprising:
in response that an installation of the particular plug-in software program is requested via the user interface installing the plug-in software program, and executing the requested function.

14. The method of claim 11, wherein the authentication information comprises at least one of a signature, a version, or a service ID of the temporarily installed first plug-in software program.

15. The method of claim 11, further comprising adding at least one icon corresponding to the completely installed first plug-in software program to a home screen of the application program.

16. The method of claim 11, further comprising:
receiving, from the first external server, a push message including at least one of information regarding at least one new plug-in software program related to the application program, and update information regarding the completely installed first plug-in software program; and
when the push message is selected, displaying a user interface for at least one of installing the at least one new plug-in software program, and updating the completely installed first plug-in software program on the display.

17. The method of claim 11, further comprising:
receiving a request to install a plug-in software program related to at least one payment means registered at the application program; and
when receiving the request for the installation, displaying a user interface for inducing the installation of the plug-in software program.

18. The method of claim 11, further comprising:
receiving a request for registration of a payment means related to the completely installed first plug-in software program; and
displaying a user interface for registering the payment means in response to the request for the registration being received.

19. The method of claim 18, further comprising registering the payment means to at least one of the completely installed first plug-in software program or the application program.

20. The method of claim 11, wherein extracting the authentication information comprises extracting application information identifying the temporarily installed first plug-in software program from the temporarily installed first plug-in software program as the authentication information.

* * * * *